United States Patent

Ishikawa

(10) Patent No.: US 12,367,286 B2
(45) Date of Patent: Jul. 22, 2025

(54) SERVER APPARATUS AND CONTROL METHOD THEREOF, INFORMATION PROCESSING APPARATUS AND CONTROL METHOD THEREOF, INFORMATION PROCESSING SYSTEM, AND STORAGE MEDIUM

(71) Applicant: Canon Kabushiki Kaisha, Tokyo (JP)

(72) Inventor: Akira Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 18/065,679

(22) Filed: Dec. 14, 2022

(65) Prior Publication Data

US 2023/0195893 A1    Jun. 22, 2023

(30) Foreign Application Priority Data

Dec. 20, 2021 (JP) ................. 2021-206271

(51) Int. Cl.
*G06F 21/57* (2013.01)
*H04L 9/40* (2022.01)

(52) U.S. Cl.
CPC ........ *G06F 21/57* (2013.01); *G06F 2221/033* (2013.01); *H04L 63/20* (2013.01)

(58) Field of Classification Search
CPC ....... G06F 21/57–577; G06F 21/70–79; G06F 2221/034; H04L 63/20–205
See application file for complete search history.

(56) References Cited

U.S. PATENT DOCUMENTS

| | | | | |
|---|---|---|---|---|
| 6,766,458 | B1 * | 7/2004 | Harris | G06F 21/577 714/38.14 |
| 11,533,342 | B1 * | 12/2022 | Smith | H04L 41/0813 |
| 2004/0072580 | A1 * | 4/2004 | Honda | H04W 4/021 455/566 |
| 2006/0294580 | A1 * | 12/2006 | Yeh, Jr. | H04L 63/20 726/3 |
| 2008/0055100 | A1 * | 3/2008 | Mathur | H04L 41/0869 340/679 |
| 2013/0132854 | A1 * | 5/2013 | Raleigh | G06F 3/0482 715/738 |
| 2015/0213258 | A1 * | 7/2015 | Masui | G06F 21/45 726/26 |
| 2023/0153044 | A1 * | 5/2023 | Kulkarni | G06F 3/123 358/1.15 |

FOREIGN PATENT DOCUMENTS

| | | |
|---|---|---|
| JP | H08-278871 A | 10/1996 |
| JP | 2020120149 A * | 8/2020 |

* cited by examiner

*Primary Examiner* — Madhuri R Herzog
(74) *Attorney, Agent, or Firm* — Venable LLP

(57) ABSTRACT

A server apparatus receives setting information that indicates settings of an information processing apparatus, and obtains a default setting for each of a plurality of particular setting items that are related to security among a plurality of setting items in the information processing apparatus. The server apparatus detects, based on the setting information, whether or not a setting of each of the plurality of particular setting items has been changed from the default setting, and notifies a user of a detection result in a case where it has been detected that none of the settings of the plurality of particular setting items has been changed from the default setting.

15 Claims, 12 Drawing Sheets

SERVER APPARATUS AND CONTROL METHOD THEREOF, INFORMATION PROCESSING APPARATUS AND CONTROL METHOD THEREOF, INFORMATION PROCESSING SYSTEM, AND STORAGE MEDIUM

BACKGROUND OF THE INVENTION

Field of the Invention

The present invention relates to a server apparatus and a control method thereof, an information processing apparatus and a control method thereof, an information processing system, and a storage medium.

Description of the Related Art

In information processing apparatuses (information equipment), such as image forming apparatuses, it is necessary to perform appropriate settings of a security-related function in accordance with a usage environment (e.g., an office environment such as a company LAN, a home environment, or a public space). At the time of shipment of an information processing apparatus, default settings that are suitable for an office environment (company LAN), for example, are performed for the information processing apparatus. Therefore, it is necessary to appropriately change settings of security-related setting items from default settings in accordance with a usage environment of the information processing apparatus.

Regarding a change from default settings, Japanese Patent Laid-Open No. H8-278871 describes a technique for detecting setting items that have been changed from a default value and displaying contents of changed settings in an information processing apparatus. This allows a user to easily grasp contents of settings that have been changed from a default value when the user performs desired settings.

However, if the user (administrator) who manages the information processing apparatus does not have sufficient knowledge in security, there is a possibility that they may not recognize that it is necessary to change security-related settings for each usage environment. In such a case, there is a possibility that security-related settings may not be changed properly, such as the information processing apparatus will be operated without the security-related settings being changed from the default settings.

SUMMARY OF THE INVENTION

Accordingly, the present invention provides a technique for allowing a user to appropriately recognize a need to review security-related settings in an information processing apparatus.

According to one aspect of the present invention, there is provided a server apparatus that is capable of communicating with an information processing apparatus, the server apparatus comprising: a reception unit configured to receive setting information that indicates settings of the information processing apparatus; an obtainment unit configured to obtain a default setting for each of a plurality of particular setting items that are related to security among a plurality of setting items in the information processing apparatus; a detection unit configured to detect, based on the setting information, whether or not a setting of each of the plurality of particular setting items has been changed from the default setting; and a notification unit configured to notify a user of a detection result in a case where it has been detected by the detection unit that none of the settings of the plurality of particular setting items has been changed from the default setting.

According to another aspect of the present invention, there is provided an information processing apparatus comprising: a holding unit configured to hold setting information that indicates settings of the information processing apparatus; an obtainment unit configured to obtain a default setting for each of a plurality of particular setting items that are related to security among a plurality of setting items in the information processing apparatus; a detection unit configured to detect, based on the setting information, whether or not a setting of each of the plurality of particular setting items has been changed from the default setting; and a notification unit configured to notify a user of a detection result in a case where it has been detected by the detection unit that none of the settings of the plurality of particular setting items has been changed from the default setting.

According to still another aspect of the present invention, there is provided a control method of a server apparatus that is capable of communicating with an information processing apparatus, the control method comprising: receiving setting information that indicates settings of the information processing apparatus; obtaining a default setting for each of a plurality of particular setting items that are related to security among a plurality of setting items in the information processing apparatus; detecting, based on the setting information, whether or not a setting of each of the plurality of particular setting items has been changed from the default setting; and notifying a user of a detection result in a case where it has been detected in the detecting that none of the settings of the plurality of particular setting items has been changed from the default setting.

According to yet another aspect of the present invention, there is provided a control method of an information processing apparatus comprising, the control method comprising: holding setting information that indicates settings of the information processing apparatus; obtaining a default setting for each of a plurality of particular setting items that are related to security among a plurality of setting items in the information processing apparatus; detecting, based on the setting information, whether or not a setting of each of the plurality of particular setting items has been changed from the default setting; and notifying a user of a detection result in a case where it has been detected in the detecting that none of the settings of the plurality of particular setting items has been changed from the default setting.

According to still yet another aspect of the present invention, there is provided a non-transitory computer-readable storage medium storing a program for causing a computer to execute a control method of a server apparatus that is capable of communicating with an information processing apparatus, the control method comprising: receiving setting information that indicates settings of the information processing apparatus; obtaining a default setting for each of a plurality of particular setting items that are related to security among a plurality of setting items in the information processing apparatus; detecting, based on the setting information, whether or not a setting of each of the plurality of particular setting items has been changed from the default setting; and notifying a user of a detection result in a case where it has been detected in the detecting that none of the settings of the plurality of particular setting items has been changed from the default setting.

According to yet still another aspect of the present invention, there is provided a non-transitory computer-readable storage medium storing a program for causing a computer to execute a control method of an information processing apparatus, the control method comprising: holding setting information that indicates settings of the information processing apparatus; obtaining a default setting for each of a plurality of particular setting items that are related to security among a plurality of setting items in the information processing apparatus; detecting, based on the setting information, whether or not a setting of each of the plurality of particular setting items has been changed from the default setting; and notifying a user of a detection result in a case where it has been detected in the detecting that none of the settings of the plurality of particular setting items has been changed from the default setting.

Further features of the present invention will become apparent from the following description of exemplary embodiments (with reference to the attached drawings).

DESCRIPTION OF THE EMBODIMENTS

Figure 1:
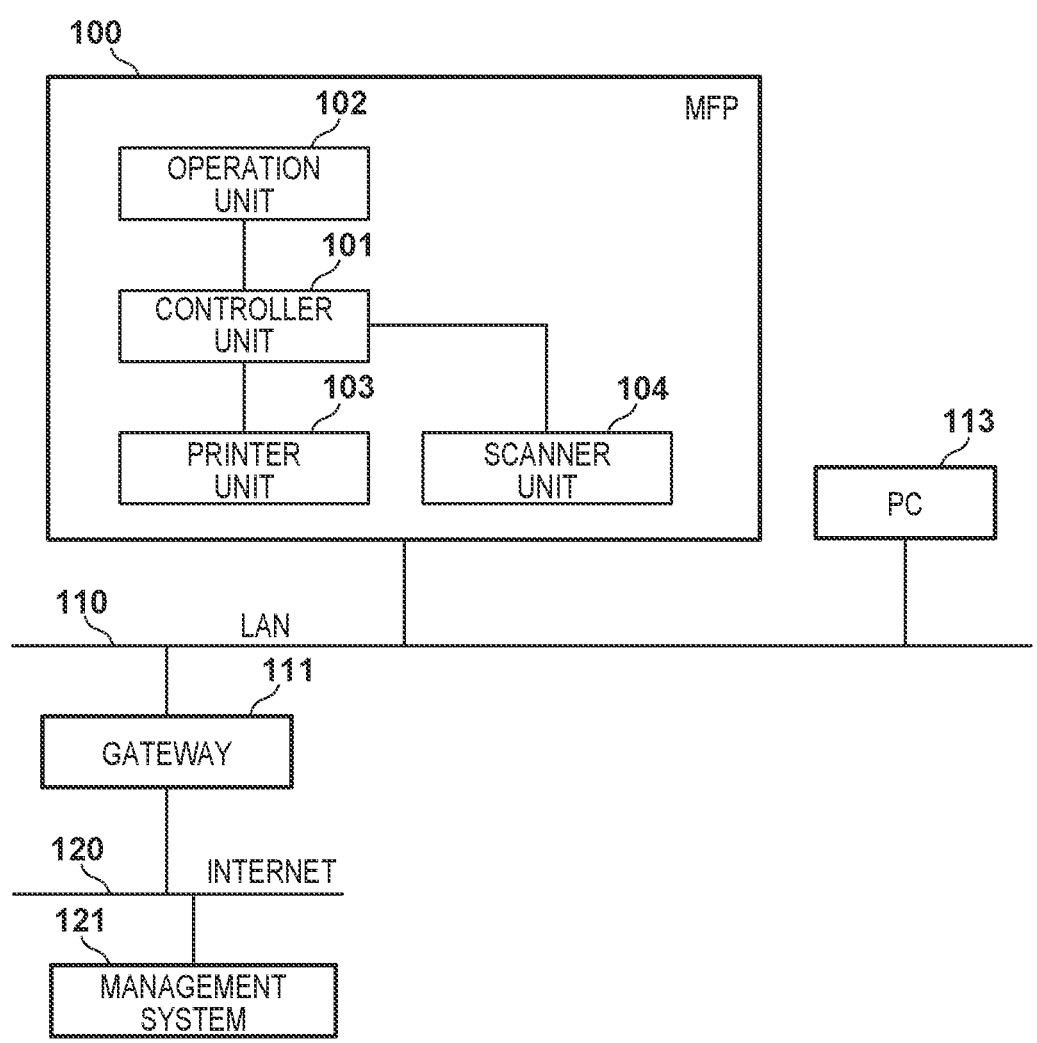
FIG. 1 is a block diagram illustrating an example of a configuration of a network and an MFP.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In a first embodiment of the present disclosure, a description will be given for an example in which processing for diagnosing security-related settings of information equipment (information processing apparatus) is performed on a cloud system (management system) side in an information processing system.

<Network Configuration>

FIG. 1 is a block diagram illustrating an example of a network configuration according to embodiments of the present disclosure. In the example of FIG. 1, a multifunction peripheral (MFP) 100 and a PC 113 are connected to a LAN 110 and can communicate via the LAN 110. The LAN 110 is configured as a wired LAN but may be configured as a wireless LAN. The MFP 100 is an image forming apparatus (image processing apparatus) that includes a plurality of functions, such as a printing function (image forming function), a reading function, and a copying function, and is an example of an information processing apparatus according to the present embodiment. In the present embodiment, the MFP 100, and a server apparatus (a server 250 in FIG. 2B) that constitutes a management system 121 may constitute the information processing system.

A gateway 111 is connected between the LAN 110 and the Internet 120 and is provided as a relay apparatus (network router) that relays communication between the LAN 110 and the Internet 120. The management system 121 is a cloud system that is for managing the MFP 100 and includes a function of remotely monitoring a state of the MFP 100. The management system 121 is connected to the Internet 120. The MFP 100 can communicate with the management system 121 via the LAN 110, the gateway 111 and the Internet 120. The management system includes a function of performing processing for diagnosing security-related settings of the MFP 100 to be managed and providing a management screen 400, which indicates a diagnostic result to a user (details will be described later). The management system also includes a function of managing results of printing and copying of the MFP 100 to be managed and providing to the user a statistical screen for performing a summary display of the results in a graph or the like. It also includes a function of providing to the user a consumables screen for confirming a status of consumables of the MFP 100 to be managed. As described above, the management system 121 of the present embodiment is a cloud system that comprehensively manages various states of a device to be managed, which is typified by the MFP 100 or the like, and, based on information to be managed, provides, to the user, screens that are related to monitoring and management.

<MFP>

FIG. 1 further illustrates an example of a hardware configuration of the MFP 100. The MFP 100 includes a controller unit 101 and an operation unit 102, a printer unit 103, and a scanner unit 104, which are connected to the controller unit. The controller unit 101 realizes functions as a multifunction peripheral by controlling the operation unit 102, the printer unit 103, and the scanner unit 104.

The operation unit 102 accepts a user operation (e.g., an operation for various settings of the MFP 100). The operation unit 102 further includes a display device (display unit) for displaying a screen and, for example, can display an operation screen for accepting a user operation. The printer unit 103 prints (outputs) an image onto a printing material, such as a sheet, based on print data (image data) that has been inputted from the controller unit 101. The scanner unit 104 generates image data by reading an image of a document and outputs the generated image data to the controller unit 101.

Figure 2A:
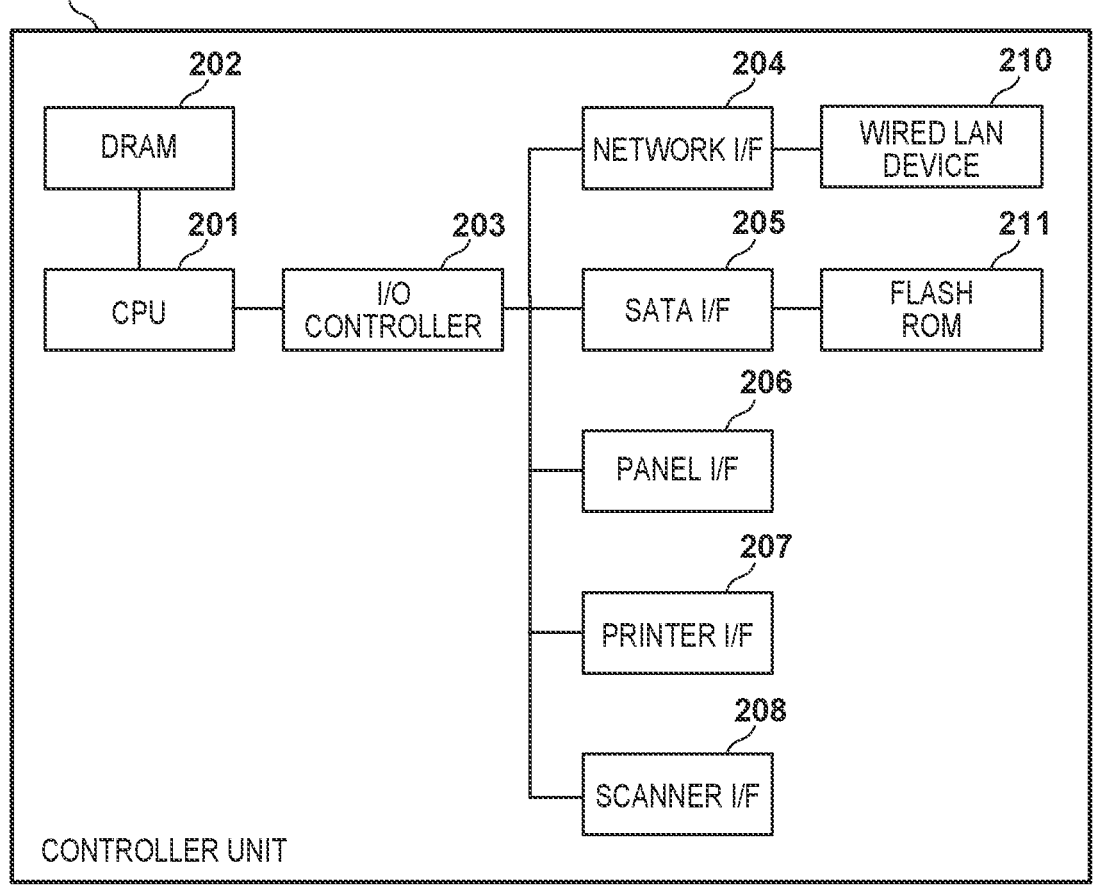
FIGS. 2A and 2B are block diagrams illustrating examples of configurations of a controller unit of the MFP and a server, respectively.

FIG. 2A is a block diagram illustrating an example of a hardware configuration of the controller unit 101 of the MFP 100. The controller unit 101 includes a CPU 201, a DRAM 202, an input/output (I/O) controller 203, a network interface (I/F) 204, a serial advanced technology attachment (SATA) I/F 205, a panel I/F 206, a printer I/F 207, and a scanner I/F 208. The controller unit 101 further includes a wired LAN device 210, which is connected to the network I/F 204, and a flash ROM 211, which is connected to the SATA I/F 205.

The CPU 201 controls an operation of the entire MFP 100. The CPU 201 is connected to the DRAM 202 and the I/O controller 203 via a bus. The DRAM 202 is a volatile storage medium and is used as a work memory for temporarily storing programs to be executed by the CPU 201 and data to be processed by the CPU 201. The CPU 201 loads into the DRAM 202 a program that is stored in the flash ROM 211, and reads out and executes the loaded program.

The I/O controller 203 performs input and output to and from various devices in accordance with instructions from the CPU 201. The network I/F 204, the SATA I/F 205, the panel I/F 206, the printer I/F 207, and the scanner I/F 208 are connected to the I/O controller 203. The CPU 201 accesses the flash ROM 211 via the SATA I/F 205. The flash ROM 211 is a non-volatile storage medium and is used for storing various programs for realizing functions of the MFP 100 and, various kinds of data such as document data and image data.

The CPU 201 communicates with external apparatuses, such as the PC 113 and the management system 121, via the LAN 110 by controlling the wired LAN device 210 via the network I/F 204. The CPU 201 controls an operation of the operation unit 102 via the panel I/F 206. The CPU 201 displays on the operation unit 102 an operation screen for accepting a user operation and accepts a user operation via the operation unit 102. That is, the operation unit 102 functions as a display unit that displays information to the user and an acceptance unit that accepts a user operation.

The CPU 201 controls an operation of the printer unit 103 via the printer I/F 207 and controls an operation of the scanner unit 104 via the scanner I/F 208. The CPU 201 realizes a copying function that utilizes the printer unit 103 and the scanner unit 104 by loading into the DRAM 202 a control program from the flash ROM 211 via the SATA I/F 205, and reading out and executing the loaded control program. In a case of executing the copying function, when the CPU 201 accepts a copy instruction from the user via the operation unit 102, the CPU 201 causes the scanner unit 104 to execute reading processing for reading an image of a document. The CPU 201 stores in the DRAM 202 the read image data that has been outputted from the scanner unit 104 and performs, on the stored read image data, image processing, such as color conversion processing that is suitable for output by the printer unit 103. The CPU 201 then transfers the image-processed image data to the printer unit 103 via the printer I/F 207 and causes the printer unit 103 to execute printing processing for printing an image onto a printing material based on the image data.

In the present embodiment, hardware, such as the CPU 201, the DRAM 202, and the flash ROM 211, constitutes a so-called computer. In the present embodiment, a case where one CPU 201 executes each process that is indicated in a flowchart, which will be described later, using a program that is loaded in one memory (the DRAM 202) is exemplified; however, each process may be executed in another manner. For example, each process that is indicated in a flowchart, which will be described below, may be executed by a plurality of processors, memories, and storages cooperating.

<Management System>

Figure 2B:
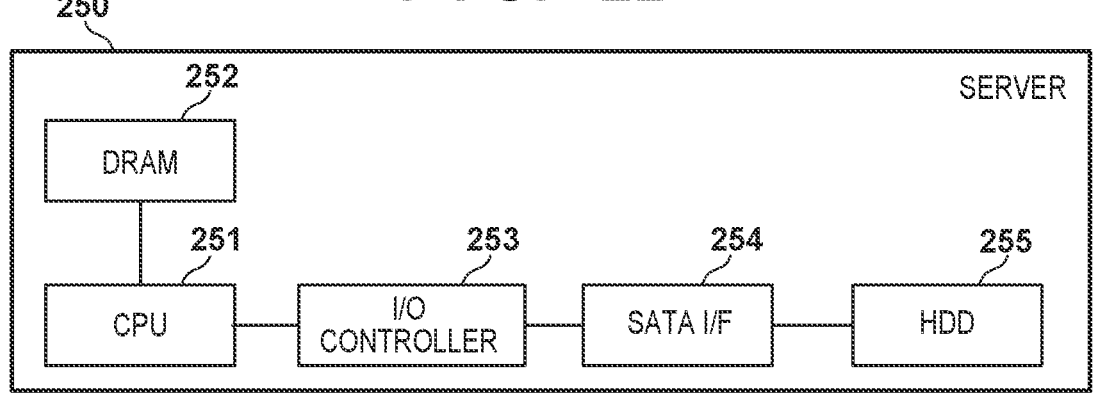

FIG. 2B is a block diagram illustrating an example of a hardware configuration of the server 250 that configures the management system 121. The server 250 includes a CPU 251, a DRAM 252, an I/O controller 253, an SATA I/F 254, and a hard disk drive (HDD) 255. The server 250 is an example of a server apparatus that is capable of communicating with an information processing apparatus (the MFP 100).

The CPU 251 controls an operation of the entire server 250. The CPU 251 is connected to the DRAM 252 and the I/O controller 253 via a bus. The DRAM 252 is a volatile storage medium and is used as a work memory for temporarily storing programs to be executed by the CPU 251 and data to be processed by the CPU 251. The CPU 251 loads into the DRAM 252 a program that is stored in the HDD 255, and reads out and executes the loaded program.

The I/O controller 253 performs input and output to and from various devices in accordance with instructions from the CPU 251. The SATA I/F 254 is connected to the I/O controller 203 and the HDD 255 is connected to the SATA I/F 254. The HDD 255 is a non-volatile storage medium and is used for storing various programs for realizing functions of the server 250, and various kinds of data such as setting data (setting values).

In the present embodiment, hardware, such as the CPU 251, the DRAM 252, and the HDD 255, configures a so-called computer. In the present embodiment, a case where one CPU 251 executes each processing that is indicated in a flowchart, which will be described later, using a program that is loaded in one memory (the DRAM 252) is exemplified; however, each processing may be executed in another manner. For example, each processing that is indicated in a flowchart, which will be described below, may be executed by a plurality of processors, memories, and storages cooperating. Alternatively, each processing may be executed using a plurality of server computers. The server 250 may be configured to provide the management system 121 to a plurality of different tenants by using a containerization or virtualization technology.

<Functional Configuration of MFP>

Figure 3A:
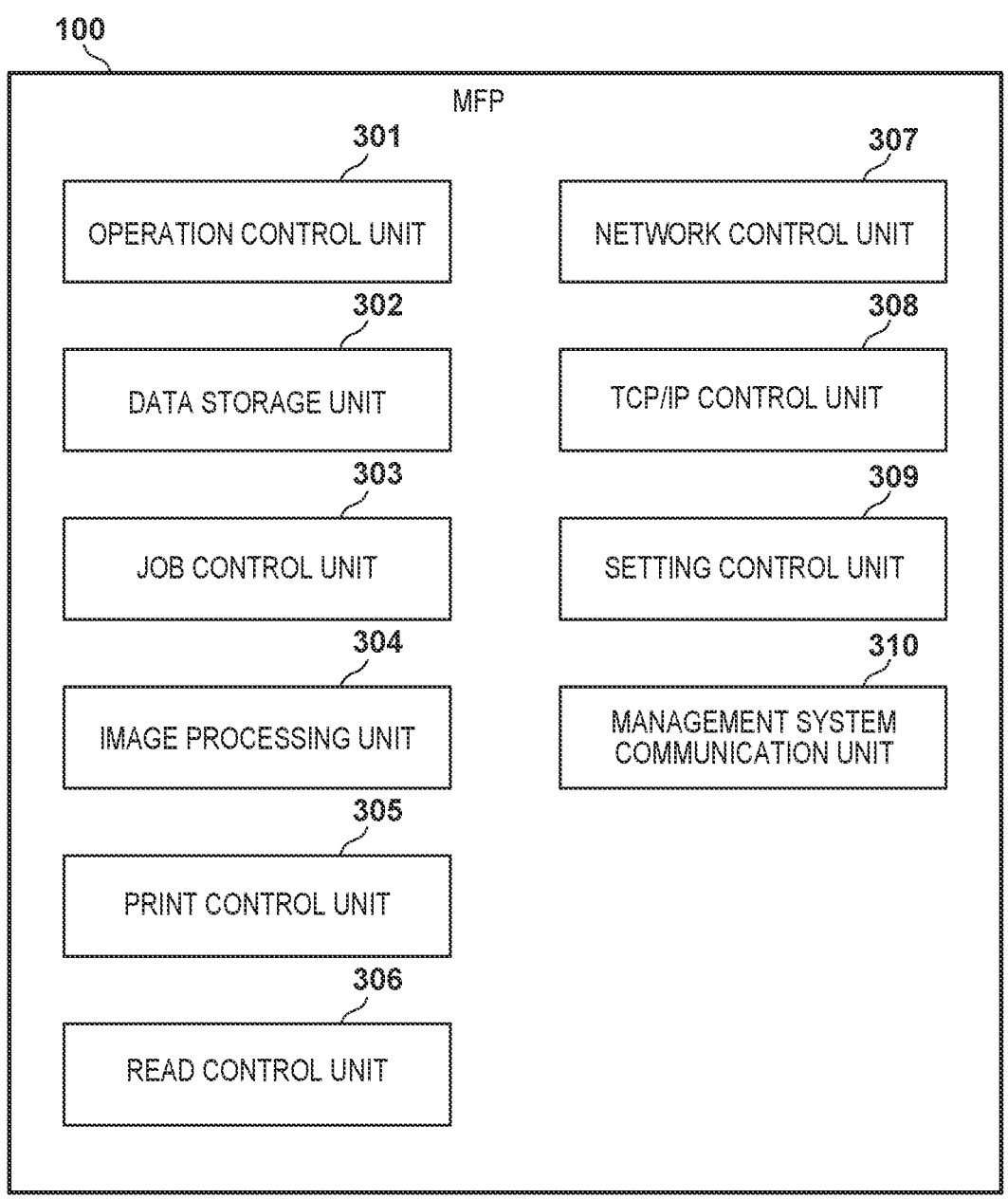
FIGS. 3A and 3B are block diagrams illustrating an example of a functional configuration of the MFP and an example of a functional configuration of the server, respectively.

FIG. 3A is a block diagram illustrating an example of a software configuration (an example of a functional configuration) of the MFP 100. Functions of the respective blocks that are illustrated in FIG. 3A can be realized by the CPU 201 reading out to the DRAM 202 a program that is stored in the flash ROM 211 and executing the program.

An operation control unit 301 displays on the operation unit 102 a screen (operation screen) for the user and accepts a user operation via the operation unit 102. The operation control unit 301 executes processing that is associated with a display object, such as a button on a display screen, in accordance with the accepted user operation.

A data storage unit 302 accesses (stores data to and reads out the stored data from) the flash ROM 211 based on a request from a respective functional unit (control unit). For example, when the user wants to change a device setting of some sort, the operation control unit 301 accepts user input via the operation unit 102 and makes a request to the data storage unit 302 to store a setting value (setting data) that corresponds to contents of the input. The data storage unit 302 stores the setting value in the flash ROM 211 in accordance with the request from the operation control unit 301.

A job control unit 303 controls execution of a job in accordance with an instruction from a respective functional unit (control unit). An image processing unit 304 performs image processing for processing image data to be processed into data of a format that is suitable for a usage thereof in accordance with an instruction from the job control unit 303. A print control unit 305 controls printing processing by the printer unit 103 via the printer I/F 207 in accordance with an instruction from the job control unit 303. A read control unit 306 controls reading processing by the scanner unit 104 via the scanner I/F 208 in accordance with an instruction from the job control unit 303.

A network control unit 307 performs network setting, such as setting of an IP address, for a TCP/IP control unit 308 at the time of system startup or at the time of detection of a setting change in accordance with a setting value (setting data) that is stored in the data storage unit 302. The TCP/IP control unit 308 transmits and receives network packets via the network I/F 204 in accordance with an instruction from a respective functional unit (control unit).

A setting control unit 309 controls security-related settings in the MFP 100 and stores, references, and changes setting values (setting data) of the MFP 100 via the data storage unit 302. Specifically, the setting control unit 309 manages a correspondence relationship between a usage environment of the MFP 100 and security-related setting items and, based on the correspondence relationship, can perform security-related settings. For example, in response to a usage environment being specified by the user, the setting control unit 309 collectively performs settings for setting items that correspond to the specified usage environment. For example, a usage environment, such as a company LAN, a home environment, or a public space, may be specified.

The setting control unit 309 also manages a correspondence relationship between a security policy and security-related setting items and, based on the correspondence relationship, can perform security-related settings. For example, in response to a security policy being specified by the user, the setting control unit 309 collectively performs settings for setting items that correspond to the specified security policy. A policy, such as no use of weak encryption, no use of plaintext communication, or prohibition of guest use, for example, may be specified as a security policy.

Furthermore, the setting control unit 309 manages, among the security-related setting items, setting items to be changed for each usage environment and default values (default settings) thereof. The setting control unit 309 notifies the management system 121 of setting values of such setting items and default values thereof via a management system communication unit 310.

The management system communication unit 310 performs communication for transmitting and receiving information between the management system 121 (server 250) and the MFP 100 via the network control unit 307. Specifically, when a setting has been changed in the MFP 100, the management system communication unit 310 notifies the management system 121 of a changed setting value (setting data). This makes it possible to identify in the management system 121 settings in which the MFP 100 is operating.

The management system communication unit 310 also receives a notification from the management system 121 (server 250). For example, when the management system communication unit 310 receives from the management system 121 a notification that includes an instruction for a setting change for the MFP 100, the management system communication unit 310 performs processing for changing a setting value (setting data) that is held by the data storage unit 302 in accordance with the instruction.

Current setting information of the MFP 100 is thus synchronized with setting information of the MFP 100 that is held by the management system 121 (server 250). This makes it possible for the management system 121 (server 250) to confirm the current setting information of the MFP 100 and change settings of the MFP 100.

<Functional Configuration of Management System (Server)>

Figure 3B:
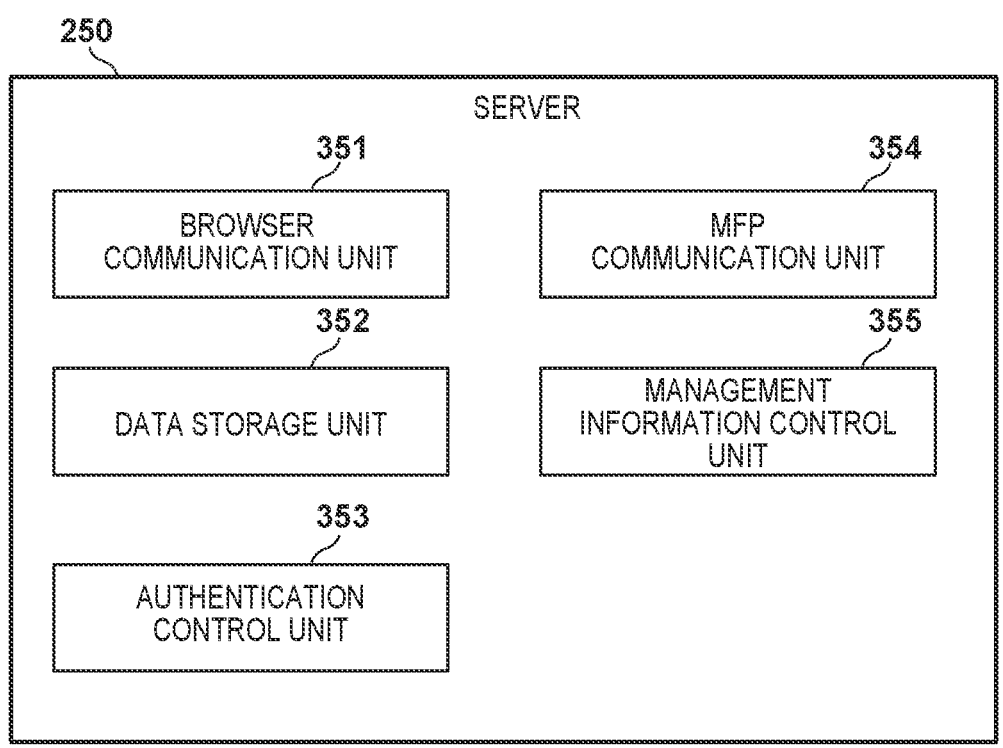

FIG. 3B is a block diagram illustrating an example of a software configuration (an example of a functional configuration) of the management system 121 (server 250). Functions of the respective blocks that are illustrated in FIG. 3B can be realized by the CPU 251 reading out to the DRAM 252 a program that is stored in the HDD 255 and executing the program.

A browser communication unit 351 communicates with a web browser that is operating on an external apparatus, such as the PC 113. For example, in response to a request that has been received from a web browser that is operating on the external apparatus, the browser communication unit 351 transmits, to the web browser, image data (screen data) for displaying a web browser screen. When the browser communication unit 351 receives data that indicates contents of an operation by the user on the web browser screen, the browser communication unit 351 performs processing that corresponds to the contents of the operation (e.g., processing that is associated with a display object, such as a button, that has been operated on the web browser screen).

A data storage unit 352 performs access to (stores data to and reads out the stored data from) the HDD 255 for various kinds of data based on a request from a respective functional unit (control unit). For example, when the user wants to change a device setting of some sort, the browser communication unit 351 receives contents of the change from an external apparatus and makes a request to the data storage unit 352 to save a setting value (setting data) that corresponds to the contents of the received change. The data storage unit 352 stores the setting value in the HDD 255 in accordance with the request from the browser communication unit 351. The data storage unit 352 may store various kinds of data in distributed resources on the cloud.

The data storage unit 352 holds, in the HDD 255 (or a distributed resource on the cloud), attribute information that is related to each security-related setting item. The attribute information includes, for example, the following information:
information that indicates whether a setting item is to be controlled based on a security policy;
information that indicates whether a setting item is to be controlled based on a security setting manual;
information that indicates whether a setting item is included in a setting category that can be selected via the operation unit 102;
information that indicates whether a setting item is an essential setting item for network connection;
information that indicates whether a setting item is an essential setting item for cloud connection; and
information that indicates whether a setting item is an essential setting item for setting change detection.

An authentication control unit 353 authenticates the user who uses the management system 121 (server 250) by using authentication information that has been obtained by the browser communication unit 351 and account information that is stored in the data storage unit 352. An MFP communication unit 354 controls communication with the MFP 100.

A management information control unit 355 performs processing for generating contents of management information to be displayed to the user, such as an administrator who has been authenticated by the above-described authentication in an external apparatus, such as the PC 113, via the browser communication unit 351. For example, when displaying information that indicates that security-related settings have not been changed from default settings, the management information control unit 355 generates appropriate screen data that indicates that information by processing the data that is held by the data storage unit 352.

<Example of Operation Screen of Management System>

Figure 4A:
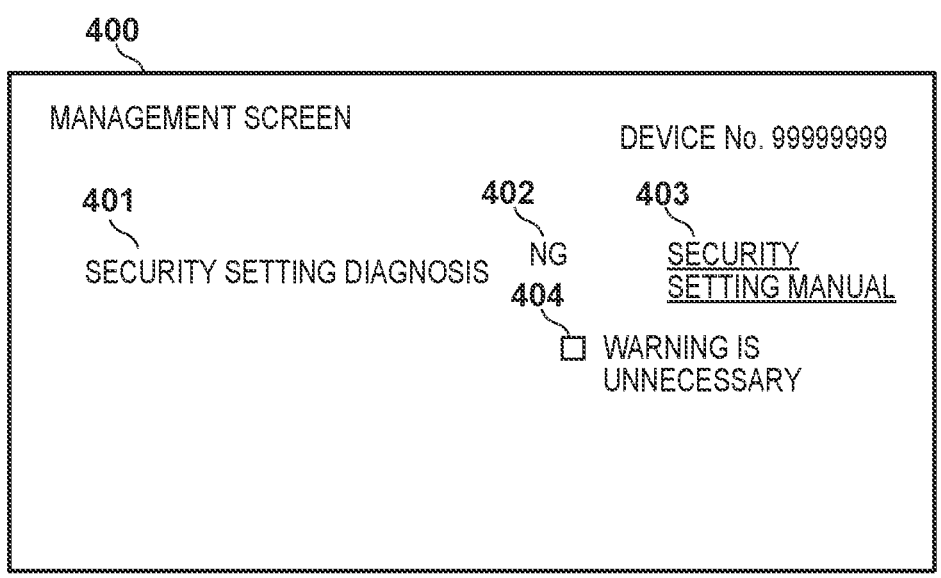
FIGS. 4A and 4B illustrate an example of an operation screen for management of the MFP and an example of an operation screen for security settings of the MFP, respectively.

FIG. 4A illustrates the management screen 400 as an example of an operation screen that is for managing the MFP 100 and is displayed by a web browser that is operating on the PC 113. The management screen 400 is an operation screen that is provided by the management system 121 (server 250) and is displayed by a web browser on the PC 113 based on screen data that is transmitted from the server 250 by the browser communication unit 351. In the present embodiment, the server 250 provides to an external apparatus (the PC 113) so as to be displayed in the external apparatus an operation screen (management screen 400) that indicates a detection result that none of the settings of a plurality of particular setting items has been changed from the default setting. The server 250 thus notifies the user of the detection result.

The management screen 400 displays information that is related to the MFP 100 (MFP to be managed) that is associated with account information of the user (administrator) that has logged into the management system 121 and provides a function of managing the MFP 100. The management screen 400 of this example includes a label 401, a status display 402, a link 403, and a check box 404.

The label 401 is a label that indicates a security setting diagnosis according to the present embodiment and is for notifying the user (administrator) of a possibility that the security settings of the MFP 100 to be managed may need to be reviewed. In a security setting diagnosis, the security-related settings of the MFP 100 are diagnosed based on detection of whether security-related settings to be changed in accordance with the usage environment of the MFP 100 have been changed from the default settings.

The status display 402 notifies the user (administrator) of a diagnostic result of the security-related settings of the MFP 100 to be managed that is based on detection of whether the security-related settings have been changed from the default settings in the MFP. That is, the display 402 indicates a diagnostic result that corresponds to the label 401. For example, if there is no problem in the security-related settings of the MFP 100 as a result of the above diagnosis, "OK" is displayed on the status display 402, and if there is a problem, "NG" is displayed.

The link 403 is a link to a web manual (security setting manual) that describes settings that are necessary for security measures for the MFP 100 to be managed. The security setting manual describes settings to be performed for when it is detected that the security-related settings have not been changed from the default settings in the MFP 100 to be managed (when a diagnostic result that there is a problem in the security-related settings is obtained). As described above, the link 403 is an example of a link to a setting manual for performing security-related settings in accordance with the usage environment of the MFP 100.

Figure 4B:
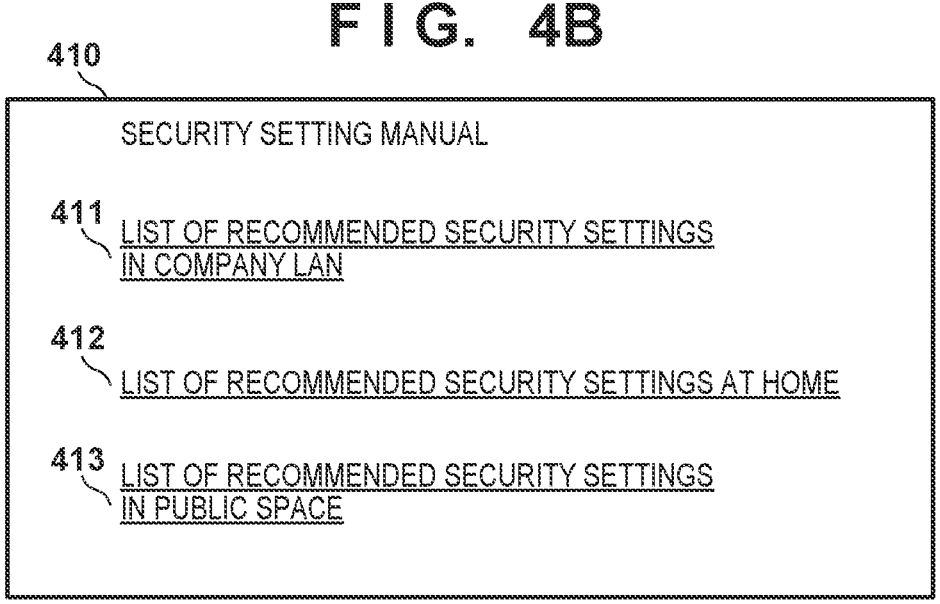

When the link 403 is selected by the user (administrator), a web screen (operation screen 410) that is illustrated in FIG. 4B is displayed by a web browser on the PC 113. A link to a security setting manual that corresponds to a model of the MFP 100 to be managed is displayed as the link 403. By thus displaying the status display 402 and the link 403 on the management screen 400 in a set, it is possible to smoothly prompt the user to confirm detailed information of settings that are necessary for security measures of the MFP 100.

The check box 404 is used for performing a setting (warning-unnecessary setting) that eliminates a need to execute processing for detecting whether the security-related settings have been changed from the default settings and executing, as necessary, display of a warning when there is no need to perform the processing. When the MFP 100 is installed in a usage environment for which there is no need to perform such processing, the user (administrator) can use a setting in which the check box 404 is checked. In the present embodiment, the check box 404 is an example of a display object for performing a setting for stopping notification of a detection result that none of the settings of a plurality of particular setting items has been changed from the default setting.

FIG. 4B illustrates, as an example of an operation screen for security settings of the MFP 100 that is displayed by a web browser that is running on the PC 113, the operation screen 410 which indicates a security setting manual. The security setting manual may be provided by the management system 121 (server 250) or may be provided by a content management server (not illustrated) that is on the Internet 120.

The operation screen 410 includes links 411 to 413 to web pages that indicate a list of recommended setting values for each usage environment of the MFP 100. The link 411 is a link for displaying a list of recommended setting values for security-related setting items for when the usage environment of the MFP 100 is a company LAN. The link 412 is a link for displaying a list of recommended setting values for security-related setting items for when the usage environment of the MFP 100 is a home environment. The link 413 is a link for displaying a list of recommended setting values for security-related setting items for when the usage environment of the MFP 100 is a public space.

<Examples of Operation Screen of MFP>

Figure 5A:
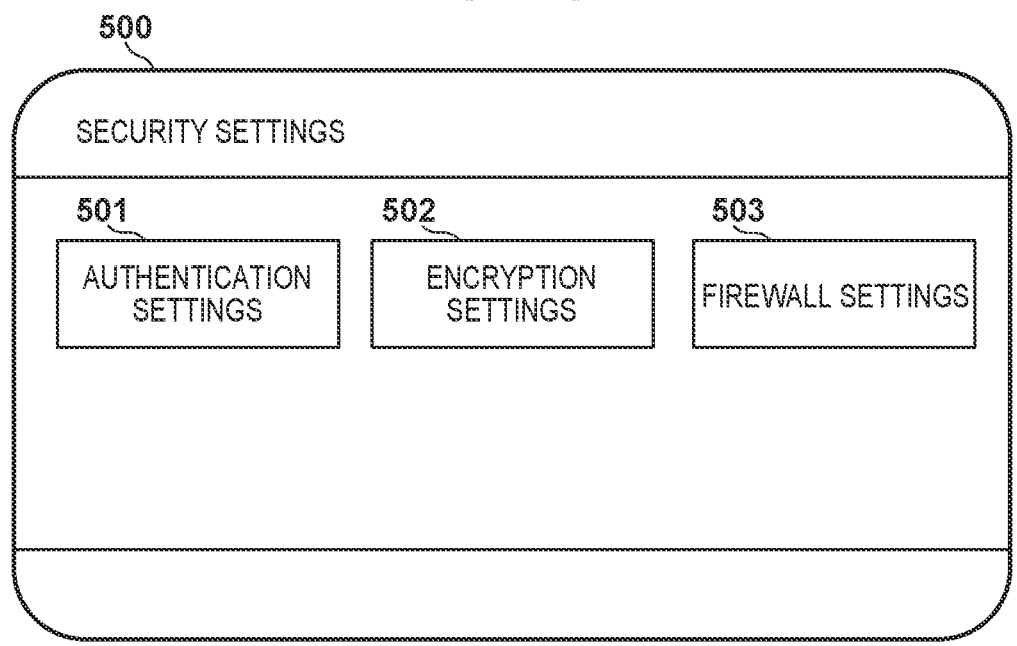
FIGS. 5A and 5B illustrate examples of operation screens to be displayed in the MFP.

FIG. 5A illustrates, as an example of an operation screen to be displayed on the operation unit 102 in the MFP 100, a setting screen 500 for security settings. The setting screen 500 includes buttons 501 to 503 as a menu for instructing confirmation and change of various security-related settings of the MFP 100. The buttons 501 to 503 correspond to security-related setting categories (authentication settings, encryption settings, and firewall settings in this example) that can be selected by the user (administrator) via the operation unit 102. Each setting category includes setting items that are related to that setting category.

The button 501 is a button for displaying a setting screen (not illustrated) for confirming and changing the authentication settings. The authentication settings include, for example, a setting of a function for which authentication processing, such as user authentication, is to be applied; a setting of an authentication method to be applied; and the like. The button 502 is a button for displaying a setting screen (not illustrated) for confirming and changing the encryption settings. The encryption settings include, for example, a setting of a function for which encryption processing is to be applied, a setting of an encryption method to be applied, and the like. The button 503 is a button for displaying a setting screen (not illustrated) for confirming and changing the firewall settings. The firewall settings include, for example, a setting for permitting or prohibiting communication for each IP address or network port, and the like.

Figure 5B:
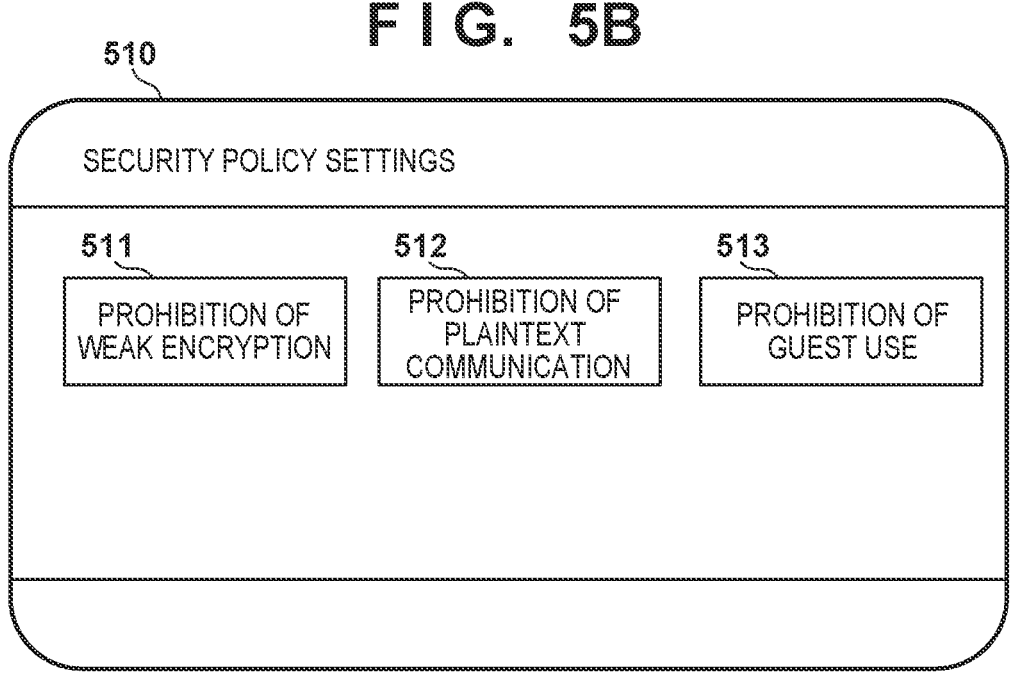

FIG. 5B illustrates, as an example of an operation screen to be displayed on the operation unit 102 in the MFP 100, a setting screen 510 for security policy settings. The setting screen 510 includes buttons 511 to 513 as a menu for instructing security policy setting for controlling various security-related settings of the MFP 100.

The button 511 is used for setting, for all the functions that use encryption processing among the functions that are included in the MFP 100, a security policy that prohibits selection of an encryption method whose encryption strength is weak. The MFP 100 includes a number of functions that use encryption processing and is configured so as to be able to individually select an encryption method for each of those functions. In such a configuration, by collectively performing, for all the functions that use encryption processing, a setting in which it is prohibited to select an encryption method whose encryption strength is weak as a security policy, it becomes possible to improve convenience of the MFP 100 and prevent setting omission.

The button 512 is used for setting, for all the functions that use communication processing among the functions that are included in the MFP 100, a security policy that prohibits communication in plaintext (i.e., prohibits communication in which encryption processing is disabled). The button 513 is used for setting, for all the functions for which authentication processing can be applied among the functions that are included in the MFP 100, a security policy that prohibits a guest login (i.e., prohibits guest use).

The MFP 100 (setting control unit 309) performs a setting for each security-related setting item in accordance with the security policy that has been set in the setting screen 510.

<MFP: Processing for Transmitting Setting Information>

Figure 6:
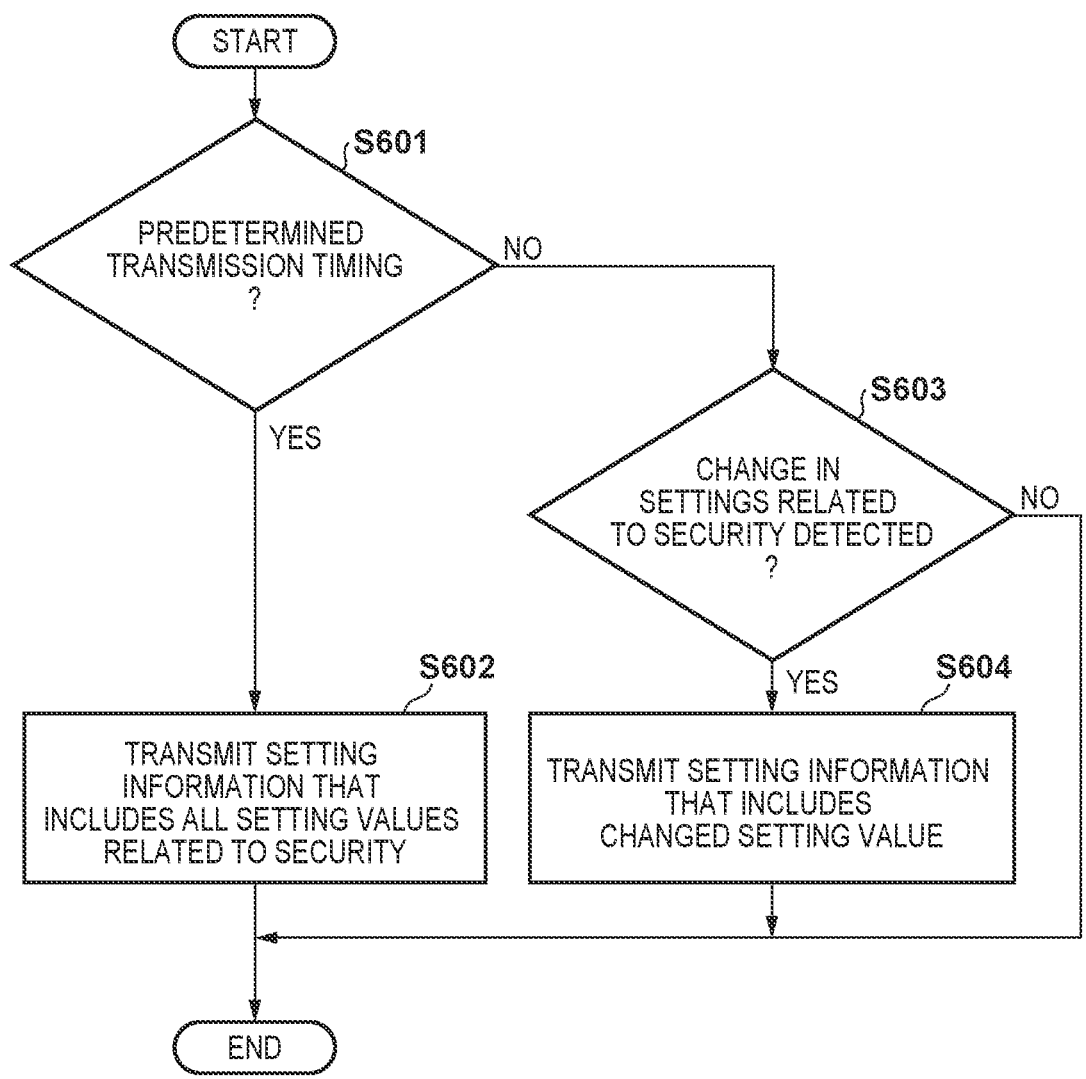
FIG. 6 is a flowchart for explaining an example of a sequence of processing for transmitting setting information by the MFP.

FIG. 6 is a flowchart for explaining an example of a sequence of processing for transmitting setting information of the MFP 100 to the management system 121, which is to be executed in the MFP 100. Processing of each step of FIG. 6 is processing by the setting control unit 309 and is realized by processing in which the CPU 201 loads into the DRAM 202 a program that is stored in the flash ROM 211 and reads out and executes the loaded program.

When a predetermined transmission condition for transmitting setting information of the MFP 100 to the management system 121 is satisfied, the MFP 100 (setting control unit 309) starts processing according to the sequence of FIG. 6. In the present embodiment, it is determined that the transmission condition is satisfied when a predetermined transmission timing is reached or when a change of a setting value that is held by the data storage unit 302 is detected. When a setting value that is held by the data storage unit 302 is changed, detection of the change is notified from the data storage unit 302 to the setting control unit 309. In addition, the predetermined transmission timing may be, for example, a timing at which a predetermined period of time has elapsed from the most recent transmission of setting information or a periodic timing for one transmission a day.

In step S601, the MFP 100 determines whether the predetermined transmission timing has been reached; when the predetermined transmission timing has been reached, the MFP 100 advances the processing to step S602, and otherwise (i.e., when a change in a setting value of some sort is detected), the MFP 100 advances the processing to step S603.

In step S602, the MFP 100 transmits, to the management system 121 (server 250), setting information that includes setting values of all the security-related setting items in the MFP 100 among the setting values that are held by the data storage unit 302 and terminates the processing according to the sequence of FIG. 6. In the transmission processing in step S602 and step S604, which will be described later, the setting control unit 309 passes, to the management system communication unit 310, setting values to be transmitted, and the management system communication unit 310 transmits, to the management system 121, setting information that includes the setting values.

In the present embodiment, in order to reduce the load of the transmission processing in the MFP 100, in step S602, setting values of setting items that may be related to security of the MFP 100 among setting values for a plurality of functions included in the MFP 100 are transmitted. Setting values of setting items other than those of security-related setting items may be transmitted; for example, setting values of all the setting items of the MFP 100 including the security-related setting items may be transmitted.

As described above, in step S602, all the setting values that are related to security of the MFP 100 are periodically transmitted to the MFP 100. This makes it possible to, even if transmission of a changed setting value (steps S603 and S604) fails for some reason (e.g., communication failure, a power-off of the MFP 100, or the like), periodically reflect the most recent setting values of the MFP 100 in the management system 121.

Meanwhile, if the processing proceeds from step S601 to step S603, the MFP 100 determines whether a change has been detected in a setting value of a security-related setting item (that is, determines whether a setting item in which a setting change has been detected is a security-related setting item). If a setting item in which a setting change has been detected is not a security-related setting item, the MFP 100 terminates the processing according to the sequence of FIG. 6, and if a setting item in which a setting change has been detected is a security-related setting item, the MFP 100 advances the processing to step S604. In step S604, the MFP 100 transmits, to the management system 121 (server 250), setting information that includes a setting value of the setting item in which a setting change has been detected and terminates the processing according to the sequence of FIG. 6.

The determination processing in step S603 is performed, for example, by comparing the setting item in which a setting change has been detected and a list of setting items that has been created in advance. This list can be created by broadly extracting, from among a plurality of setting items in the MFP 100, setting items for which there is even the slightest possibility that they may be related to security and listing the extracted setting items.

In the present embodiment, identification (step S702 in FIG. 7) of a setting item to be a target of a security setting diagnosis of the MFP 100 (security-related setting item that needs a setting change for each usage environment) is performed in the management system 121 (server 250). For this reason, in step S603, all of the setting items that may be used as a target of a security setting diagnosis in the management system 121 may be included in the above list. Considering a possibility that processing for identifying a target of a security setting diagnosis in the management system 121 may be changed during an operation of the management system 121, security-related setting items that are not a target of diagnosis may also be made a target of setting value transmission in step S604. This makes it possible to ensure the flexibility of the management system 121.

In addition, in the present embodiment, in order to reduce the load of the transmission processing in the MFP 100, only when there is a possibility that a setting item in which a setting change has been detected in step S603 is related to security of the MFP 100, a setting value of the setting item is transmitted. The MFP 100 may be configured to transmit a setting value regardless of whether a setting item in which a setting change has been detected is a security-related setting item of the MFP 100. In that case, the MFP 100 is configured to perform the processing of step S604 without performing the determination processing of step S603.

As described above, according to the sequence of processing of FIG. 6, the MFP 100 transmits setting information that indicates the settings of the MFP 100 to the server 250 at a predetermined transmission timing. In response to detecting a change in the settings of the MFP 100, the MFP 100 further transmits, to the server 250, setting information that indicates a setting of a setting item in which the change has been detected. This makes it possible to periodically reflect, in the server 250 (management system 121), setting information that indicates the current settings of the MFP 100, and by transmitting setting information (difference information) that indicates a setting of a setting item in which a change has been detected, it is possible to reduce the load of the transmission processing. The management system 121 (server 250) holds in the HDD 255 (or a distributed resource on the cloud) by the data storage unit 352 the setting information that has been received from the MFP 100.

<Management System: Processing for Diagnosing Security-Related Settings>

Figure 7:
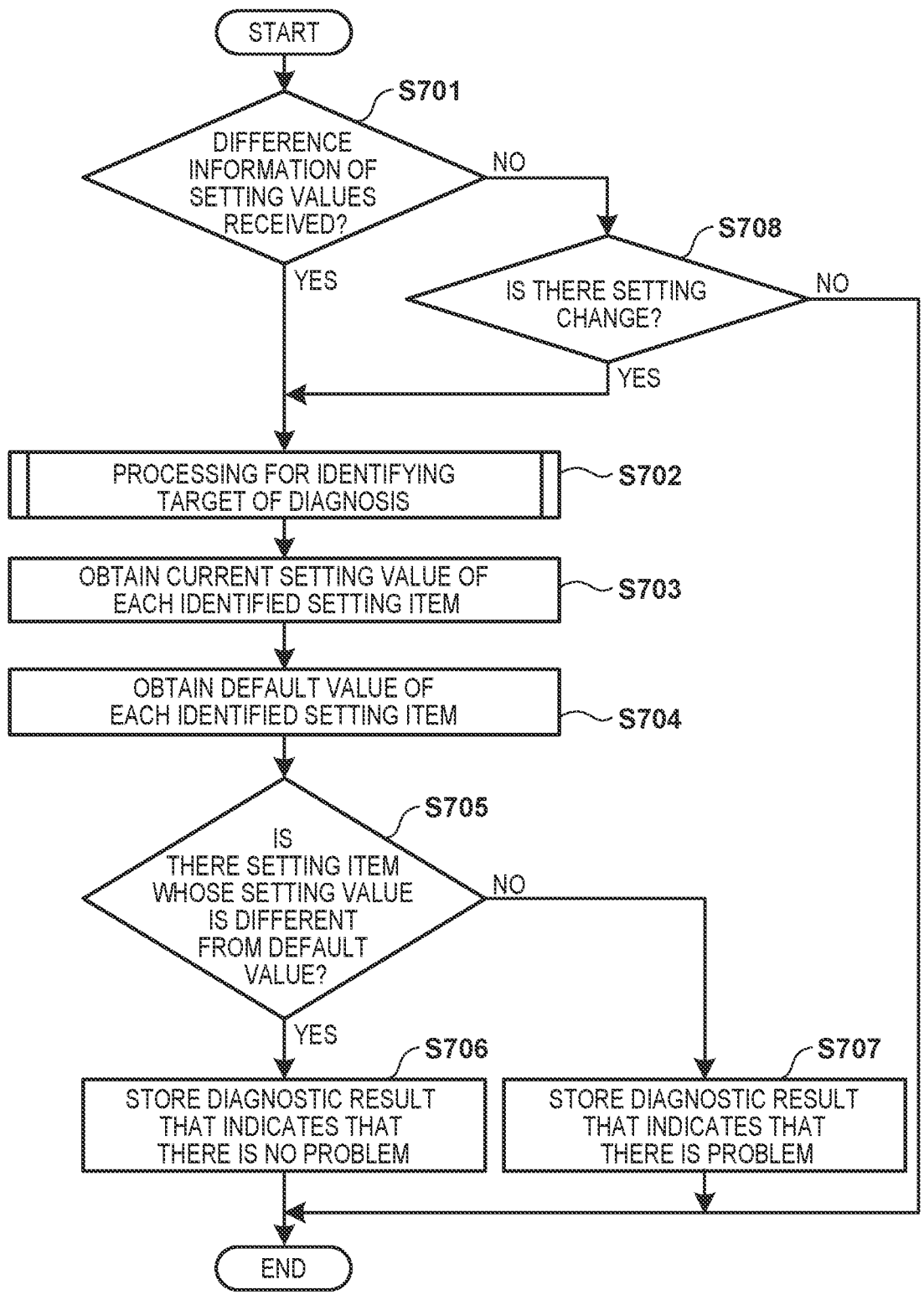
FIG. 7 is a flowchart for explaining an example of a sequence of processing for diagnosing security settings of the MFP, by a management system.

FIG. 7 is a flowchart for explaining an example of a sequence of processing for diagnosing the security-related settings of the MFP 100 to be executed in the management system 121 (server 250). In this sequence of processing, the security-related settings of the MFP 100 are diagnosed by determining whether a setting change from the default setting has been made for the setting items that need to be changed in accordance with the usage environment of the MFP 100. The processing of each step of FIG. 7 is realized by processing in which in the server 250 the CPU 251 loads into the DRAM 252 a program that is stored in the HDD 255 and reads out and executes the loaded program.

When the server 250 that configures the management system 121 receives setting information that indicates the settings of the MFP 100 from the MFP 100, the server 250 starts the processing according to the sequence of FIG. 7. The received setting information is held in the HDD 255 (or a distributed resource on the cloud) by the data storage unit 352. If setting information (difference information) that includes a changed setting value has been received, the received difference information is reflected in the setting information that corresponds to the MFP 100 and is held by the data storage unit 352.

In step S701, the server 250 determines whether the setting information (difference information) that includes the changed setting value has been received. If the server 250 has received the difference information, the server 250 advances the processing to step S702. Meanwhile, if the server 250 receives not the difference information but the setting information that includes the setting values of all the security-related setting items of the MFP 100, the server 250 advances the processing to step S708. As described above, the MFP 100 periodically transmits the setting information that includes the setting values of all the security-related setting items to the management system 121 (server 250). As described above, when the server 250 receives setting information that is periodically transmitted, the server 250 advances the processing from step S701 to step S708.

In step S708, the server 250 determines whether there is a change in any of the settings of the MFP 100 by comparing the setting information that has been received from the MFP 100 and the setting information that corresponds to the MFP 100 and is held by the data storage unit 352. If there is no setting change, the server 250 terminates the processing, and if there is a setting change, the server 250 advances the processing to step S702.

In step S702, the server 250 performs identification processing for identifying a setting item to be diagnosed in a diagnosis of security-related settings in accordance with a sequence of FIG. 8, which will be described later. In step S703, the server 250 obtains a current setting value for each setting item that has been identified as a target of diagnosis in step S702 based on the setting information that has been received from the MFP 100 (the setting information that is held by the data storage unit 352). Furthermore, in step S704, the server 250 obtains a default value for each setting item that has been identified as a target of diagnosis in step S702. That is, the server 250 obtains a default setting for each of a plurality of particular setting items that are related to security among a plurality of setting items in the MFP 100.

Next, in step S705, the server 250 determines whether there is a setting item for which the current setting value and the default value differ by comparing the current setting value and the default value for each setting item that has been identified as a target of diagnosis in step S702. That is, the server 250 detects whether each setting of the plurality of particular setting items that are related to security (setting items that have been identified as targets of diagnosis) has been changed from the default setting based on the received setting information. If there is a setting item for which the current setting value and the default value differ, the server 250 advances the processing to step S706. In step S706, the server 250 generates as a diagnostic result (a detection result) of the security-related settings a diagnostic result that indicates that there is no problem with the security-related settings. The server 250 stores the generated diagnostic result by the data storage unit 352 and terminates the processing according to the sequence of FIG. 7.

Meanwhile, as a result of the comparison in step S705, if the current setting value and the default value match for all the setting items, the server 250 advances the processing from step S705 to step S707. In step S707, the server 250 generates as a diagnostic result (a detection result) of the security-related settings a diagnostic result that indicates that there is a problem with the security-related settings. The server 250 stores the generated diagnostic result by the data storage unit 352 and terminates the processing according to the sequence of FIG. 7.

The diagnostic result that has been stored by the data storage unit 352 may be used for notifying the user. If it is detected that none of the settings of a plurality of particular setting items that are related to security (setting items that have been identified as targets of diagnosis) has been changed from the default setting by the detection in step S705, the server 250 may notify the user of the detection result.

For example, in response to a display request from a web browser that is operating on the PC 113, the server 250 transmits, to the PC 113, screen data of the management screen 400 that includes a diagnostic result of the security-related settings of the MFP 100. The management screen 400 is thus displayed by the web browser in the PC 113. The diagnostic result of the security-related settings of the MFP 100 is displayed as the status display 402 on the management screen 400. The user who operates the PC 113 is thus notified of the diagnostic result of the security-related settings of the MFP 100.

As described above, by the processing according to the sequence of FIG. 7, it is possible to generate a diagnostic result to be displayed as the status display 402 on the management screen 400. That is, such a diagnostic result can be generated based on detection of whether the security-related settings that need to be changed in accordance with the usage environment of the MFP 100 have been changed from the default settings.

<Management System: Processing for Identifying Target of Diagnosis (Step S702)>

Figure 8:
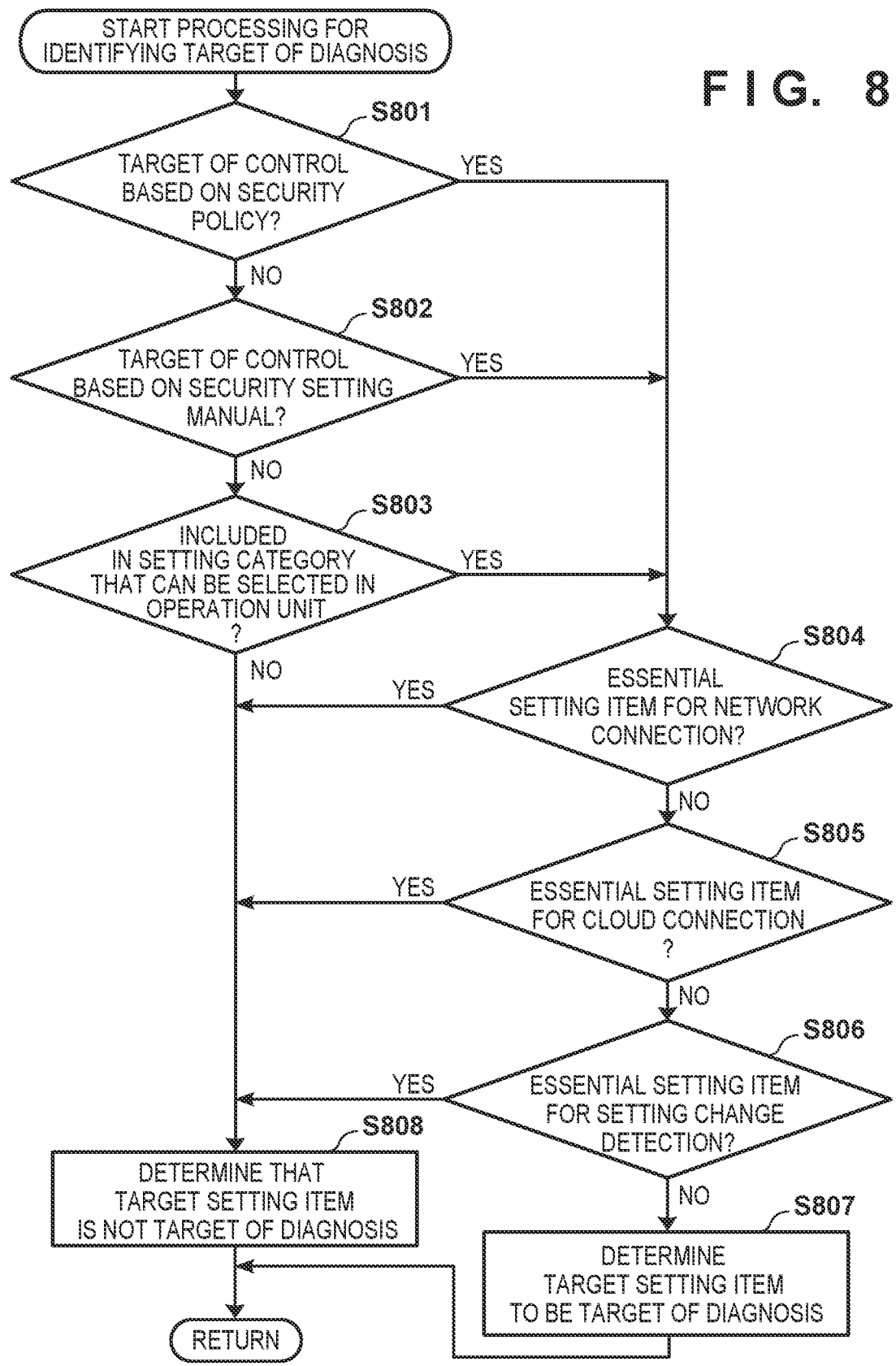
FIG. 8 is a flowchart for explaining an example of a sequence of processing for identifying a target of diagnosis (step S702).

FIG. 8 is a flowchart for explaining an example of a sequence of processing for identifying a target of diagnosis (step S702). For each setting item that is included in the setting information that has been received from the MFP, the management system 121 (server 250) executes on each setting item the processing according to the sequence of FIG. 8. The setting items (a plurality of particular setting items that are related to security) to be diagnosed in a diagnosis of security-related settings are thus identified. In addition, the server 250 performs the determination processing of steps S801 to S806, which will be described below, based on the attribute information that is related to each security-related setting item that is held by the data storage unit 352.

A plurality of particular setting items (target setting items) that are identified as targets of diagnosis are defined as setting items for which a setting is to be changed from the default setting in accordance with a usage environment of the information processing apparatus for the determination in steps S801 to S803. Specifically, a plurality of particular setting items include at least one of a setting item whose setting is controlled based on a security policy that is set in the MFP 100, a setting item whose setting is controlled based on a setting manual for settings that are related to security in the MFP 100, and a setting item that is included in a security setting category that can be selected by a user operation in the MFP 100.

In step S801, the server 250 determines whether a target setting item is a setting item to be controlled based on a security policy (that is, a setting item whose setting is controlled collectively in accordance with a security policy). The security policy may be set via the setting screen 510 that is displayed on the operation unit 102 in the MFP 100. If the target setting item is a setting item to be controlled based on a security policy, the server 250 advances the processing to step S804, and otherwise, the server 250 advances the processing to step S802.

In step S802, the server 250 determines whether the target setting item is a setting item to be controlled based on a security setting manual. The security setting manual is provided via the operation screen 410. The setting item to be controlled based on a security setting manual corresponds to a setting item that is included in a list that is displayed when a link (any of the links 411 to 413) that corresponds to the usage environment of the MFP 100 is selected on the operation screen 410. Regarding setting items that are included in a list that corresponds to a usage environment, settings are controlled according to that list. If the target setting item is a setting item to be controlled based on a security setting manual, the server 250 advances the processing to step S804, and otherwise, the server 250 advances the processing to step S803.

In step S803, the server 250 determines whether the target setting item is a setting item that is included in a setting category that can be selected in the operation unit 102 (a setting category that can be presented in the setting screen 500) of the MFP 100. If the target setting item is a setting item that is included in a setting category that can be selected by the operation unit 102 of the MFP 100, the server 250 advances the processing to step S804, and otherwise, the server 250 advances the processing to step S808.

Steps S804 to S806 are processing for excluding particular setting items from targets of diagnosis. A setting item for which it becomes necessary to change a setting from the default setting for the detection in step S705 is excluded from the plurality of particular setting items. Specifically, at least one of a setting item for connecting to a network, a setting item for connecting to a cloud system (the management system 121) that includes the server 250, and a setting item for the detection in step S7005 by the server 250 are excluded from the plurality of particular setting items.

In the processing according to this sequence, setting items that are essential for the MFP 100 to perform network connection, cloud connection, or diagnosis (detection of a setting change) in the management system 121 (server 250) are excluded from targets of diagnosis. This is intended to prevent a case where an appropriate diagnostic result cannot be obtained due to such a setting item being set as a target of diagnosis, resulting in there always being a setting item to be determined to have been changed from the default setting.

In step S804, the server 250 determines whether the target setting item is an essential setting item for network connection. An essential setting item for network connection is, for example, a setting of an IP address. If the target setting item is an essential setting item for network connection, the server 250 advances the processing to step S808, and otherwise, the server 250 advances the processing to step S805.

In the present embodiment, a diagnosis of security-related settings of the MFP 100 is performed by a cloud system (the management system 121) based on the setting information that is transmitted from the MFP 100. In order to allow the diagnosis of security-related settings in the cloud system, a setting (a setting change from a default setting) for network connection becomes essential in the MFP 100. If the setting item for network connection is set as a target of diagnosis, there will always be a setting item to be determined to have been changed from the default setting, and thereby an appropriate diagnostic result cannot be obtained. For this reason, by the processing of step S804, an essential setting item for network connection is excluded from a target of diagnosis.

In step S805, the server 250 determines whether the target setting item is an essential setting item for cloud connection. An essential setting item for cloud connection may be, for example, address information that identifies an endpoint of the management system 121 or account information that associates the MFP 100 and the user. If the target setting item is an essential setting item for cloud connection, the server 250 advances the processing to step S808, and otherwise, the server 250 advances the processing to step S806.

In the present embodiment, in order to allow a diagnosis of security-related settings in a cloud system (the management system 121), a setting for the management system communication unit 310 to notify the management system 121 of information becomes essential in the MFP 100. For this reason, similarly to step S804, by the processing of step S805, an essential setting item for cloud connection is excluded from a target of diagnosis.

In step S806, the server 250 determines whether the target setting item is an essential setting item for setting change detection (diagnosis) regarding network-related settings of the MFP 100. An essential setting item for setting change detection is, for example, enabling/disabling of a security logging function. If the target setting item is an essential setting item for setting change detection, the server 250 advances the processing to step S808, and otherwise, the server 250 advances the processing to step S807.

In the present embodiment, in order for the management system communication unit 310 to notify the management system 121 (server 250) of the setting information, it is necessary that the security logging function is enabled in the MFP 100. The security logging function is a function that records, when a setting value that is held by the data storage unit 302 is changed, a setting item that has been changed and the date and time of the change as a log by the data storage unit 302. The created log can be used for management work, such as security audit, by the user (administrator) confirming it at an arbitrary timing. The notification of setting information to the management system 121 corresponds to a cloud extension version of the security logging function. Therefore, similarly to steps S804 and S805, an essential setting item for setting change detection regarding the network-related settings of the MFP 100 is excluded from a target of diagnosis by the processing of step S806.

In step S807, the server 250 determines that the target setting item is a target of diagnosis and terminates the processing of step S702. Meanwhile, in step S808, the server 250 determines that the target setting item is not a target of diagnosis and terminates the processing of step S702. By the determination of step S807 or S808 being performed for each setting item that is included in the setting information that has been received from the MFP, setting items to be targets of diagnosis of security-related settings are identified.

As described above, by the processing according to the sequence of FIG. 8, it is possible to identify as targets of diagnosis, security-related setting items that need to be changed in accordance with the usage environment of the MFP 100. A portion of the processing from step S801 to S806 may be omitted in accordance with operation forms and the like of the MFP 100 and the management system 121.

<Example of Security Setting Diagnosis>

As described above, in the present embodiment, so long as one setting value has been changed from a default value among particular setting items that are related to the security of the MFP 100, a diagnostic result that there is no problem with the security-related settings of the MFP 100 is generated. In the following, a description will be given for an example of a security setting diagnosis and a diagnostic result thereof of the present embodiment.

Regarding security measures in information equipment (information processing apparatus), such as the MFP of the present embodiment, perfect implementation only by the information equipment alone is difficult, and implementation in combination with the security measures in the usage environment of the information equipment may be necessary. A description will be given using as an example of such security measures (security-related settings) a version of an encryption algorithm that is used for communication encryption.

Although the latest version of an encryption algorithm may have a stronger attack resistance, it cannot be used unless the communication partner information equipment can interpret that version of the encryption algorithm. In general, an encryption algorithm of the latest version is not always installed in information equipment which is replaced at long intervals, such as industrial equipment. For example, when an information equipment that is equipped with an encryption algorithm of the latest version communicates with industrial equipment that is not equipped with an encryption algorithm of that version, it is necessary to limit the version of an encryption algorithms to be used to a previous version. In such a case, in order to reduce (resolve) security risks for when using an encryption algorithm of the previous version, it is necessary to take additional security measures in the usage environment of the information equipment, such as installation of a firewall or strict premises entry restriction.

As in the above-described example, when a setting is performed to deliberately limit the version of an encryption algorithm to be used to the previous version in the information equipment, it is assumed that the user (administrator) performs such setting after taking other security measures in consideration of security risks. Meanwhile, an example in which security risks are high is where the user assumes that there is no problem in the security of the information equipment with the default settings at the time of installation regardless of the usage environment and continues to use the information equipment without sufficiently confirming the security-related settings.

In the present embodiment, as described above the user is notified in order to prompt a change of the security-related settings in accordance with detection that the information equipment (the MFP 100) is being used with the security-related settings set as the default settings unchanged. As a result of confirmation of security risks of the information equipment, if it is confirmed that safety is ensured without changing the security-related settings from the default settings, a warning-unnecessary setting may be performed (e.g., using the check box 404 of the management screen 400).

Table 1 below indicates an example of setting patterns and corresponding diagnostic results for particular security-related setting items. Table 1 exemplifies, as particular security-related setting items, a lower limit versions of a server message block (SMB), enabling/disabling of a remote user interface (RUI), and enabling/disabling of a tampering detection function.

TABLE 1

| Setting item | Default value | Pattern A | Pattern B | Pattern C |
| --- | --- | --- | --- | --- |
| Lower limit version of SMB | 2.0 | 2.0 | 3.0 | 1.0 |
| RUI | Enabled | Enabled | Enabled | Enabled |
| Tampering detection function | Disabled | Disabled | Enabled | Disabled |
| <Diagnostic result> | — | NG | OK | OK |

A setting of the lower limit version of the SMB limits the version of the SMB that the information equipment can use. In this example, a version 2.0 is set as the lower limit version in the default setting (default value). For example, while a version 1.0 can be set as the lower limit version in order to ensure compatibility with older information equipment, a version 3.0 can be set as the lower limit version in order to increase security strength.

The remote user interface (RUI) is a function for controlling information equipment from a remote external apparatus via a web browser. In this example, the RUI is enabled in the default setting (default value) in order to ensure the convenience of the information equipment. For example, in a usage environment in which the information equipment is connected to a network that is used by an unspecified number of people, the RUI may be set to disabled in order to reduce the risk of information equipment being attacked using the RUI.

The tampering detection function is a function for verifying whether a control program (control software) has been tampered with at the time of operation of the information equipment. In this example, the tampering detection function is disabled in the default setting (default value) in order to prevent deterioration of the operation performance of the information equipment due to enabling of the tampering detection function. For example, in a usage environment in which there is a possibility of an attack that aims to tamper with a control program, a setting for enabling the tampering detection function while allowing the performance of the information equipment to deteriorate may be performed.

Table 1 exemplifies setting patterns (patterns A to C) for the above setting items (the lower limit version of the SMB, the RUI, and the tampering detection function) and diagnostic results (determination results) for when the above-described diagnosis has been performed for each pattern. Similarly to the status display 402 of the management screen 400, which is illustrated in FIG. 4A, when there is no problem in the security-related settings of the information equipment (the MFP 100), "OK" is indicated as a diagnostic result, and when there is a problem, "NG" is indicated as a diagnostic result. Specifically, if a setting value has not been changed from the default value for any of the above setting items, the diagnostic result is "NG", and if a setting value of any one setting item has been changed from the default value, the diagnostic result is "OK".

The pattern A indicates an example in which the setting values of all the above setting items remain as the default values. In such a case, it is impossible to determine whether the administrator has considered appropriate settings in consideration of the usage environment of the information equipment (the MFP 100). Specifically, there is no problem if the settings of pattern A have been performed as a result of the administrator determining whether to disable the RUI and whether to enable the tampering detection function. However, in many cases, a need to change security-related settings is not noticed and information equipment is operated in a state in which there are security risks. For this reason, when the security-related settings of the information equipment have not been changed from the default settings, such as in the pattern A, it is important to warn the user (administrator) of such settings in order to eliminate the security risks. Therefore, if a particular security-related setting has not been changed from the default setting, such as in the pattern A, "NG" is generated as a diagnostic result (determination result) in order to make it possible to warn the user.

The pattern B indicates an example in which settings have been performed such that the lower limit version of the SMB is increased to the version 3.0 and the tampering detection function is enabled. When settings, such as in the pattern B, are performed, it is assumed that information equipment is being used in an environment in which there are security risks and that settings are performed after the administrator has considered such security risks. That is, it is assumed that security measures are taken after the security risks of the information equipment have been sufficiently considered, and therefore, "OK" is generated as the diagnostic result (determination result). Although the RUI has not been disabled, it is assumed that the administrator has taken additional security measures, such as installing a firewall, against enabling of the RUI as a result of considering the security risks. As described above, although it cannot be determined whether it is appropriate that a setting value of a single setting item (the RUI in this example) has not been changed from the default value, if the settings of other setting items have been changed, it can be determined that it is highly likely that appropriate settings have been performed by the administrator.

The pattern C indicates an example in which settings have been performed such that the lower limit version of the SMB is decreased to the version 1.0. When settings, such as in the pattern C, are performed, it is assumed that information equipment is used in an environment in which an older file server that is equipped with, for example, the SMB of the version 1.0, is installed. In such a usage environment, it is assumed that the administrator, while intentionally decreasing the lower limit version of the SMB that can be used by the information equipment, has taken additional security measures, such as isolating the usage environment of the information equipment from an external network. That is, it is assumed that security measures are taken after the security risks of the information equipment have been sufficiently considered, and therefore, "OK" is generated as the diagnostic result (determination result).

As described above, the server 250 of the present embodiment receives the setting information that indicates the settings of the MFP 100 (information processing apparatus). The server 250 obtains a default setting for each of a plurality of particular setting items that are related to security among a plurality of setting items in the MFP 100. The server 250 detects, based on the received setting information, whether or not each setting of the plurality of particular setting items has been changed from the default setting. Furthermore, when it is detected that none of the settings of the plurality of particular setting items has been changed from the default setting, the server 250 notifies the user of that detection result.

This allows the user, who manages the MFP 100, to recognize that the security-related settings in the MFP 100 (information processing apparatus) have not been changed from the default settings. That is, it allows the user to properly recognize a need to review security-related settings in the MFP 100. Therefore, even if the user, who manages the MFP 100, does not have sufficient knowledge in security, it is possible to appropriately perform security-related settings in accordance with the usage environment of the MFP 100.

Second Embodiment

In the second embodiment, a description will be given for an example in which processing for diagnosing the security-related settings of information equipment is performed on the side of the information equipment (information processing apparatus), which is an edge device, in the information processing system. Descriptions will be omitted for portions that are in common with the first embodiment, and descriptions will be given mainly for portions that are different from the first embodiment.

In the MFP 100 of the present embodiment, the management system communication unit 310 (FIG. 3A) does not need to perform processing for synchronizing the setting information of the MFP 100 for the management system 121. This is because processing for diagnosing security-related settings based on setting information is performed on the MFP 100 side rather than on the management system 121 side. In addition, in the present embodiment, attribute information that is related to each security-related setting item that is held in the data storage unit 352 of the server 250 (management system 121) in the first embodiment is held by the data storage unit 302 of the MFP 100. This is to allow processing for identifying a target of diagnosis based on attribute information to be performed on the MFP 100 side. The data storage unit 352 of the management system 121 does not need to hold attribute information.

<Examples of Operation Screens of MFP>

Figure 9A:
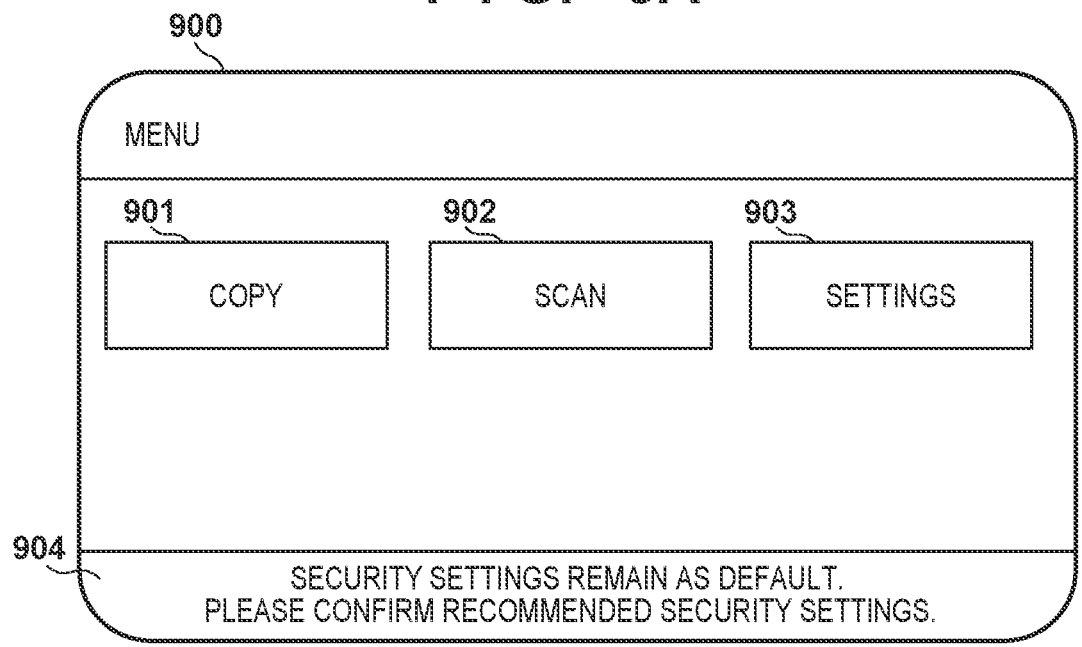
FIGS. 9A and 9B illustrate examples of operation screens to be displayed in the MFP.

FIG. 9A illustrates, as an example of an operation screen to be displayed on the operation unit 102 in the MFP 100, a menu screen 900. The menu screen 900 includes buttons 901 to 903 that correspond to a copying function, a scanning function, and a setting function of the MFP 100, respectively, and an information notification portion 904 that is used for notifying the user of information.

As a result of diagnosing the security-related settings of the MFP 100, if it has been detected that the security-related settings have not been changed from the default settings, the setting control unit 309 may display a message (warning display) that indicates that in the information notification portion 904. That message notifies the user (administrator) that the security-related settings have not been changed from the default settings and supports a user operation for changing the security-related settings. As described above, the setting control unit 309 displays on the operation unit 102 an operation screen (menu screen 900) that includes a message that indicates a detection result that none of the setting of a plurality of particular setting items that are related to security has been changed from the default setting.

Figure 9B:
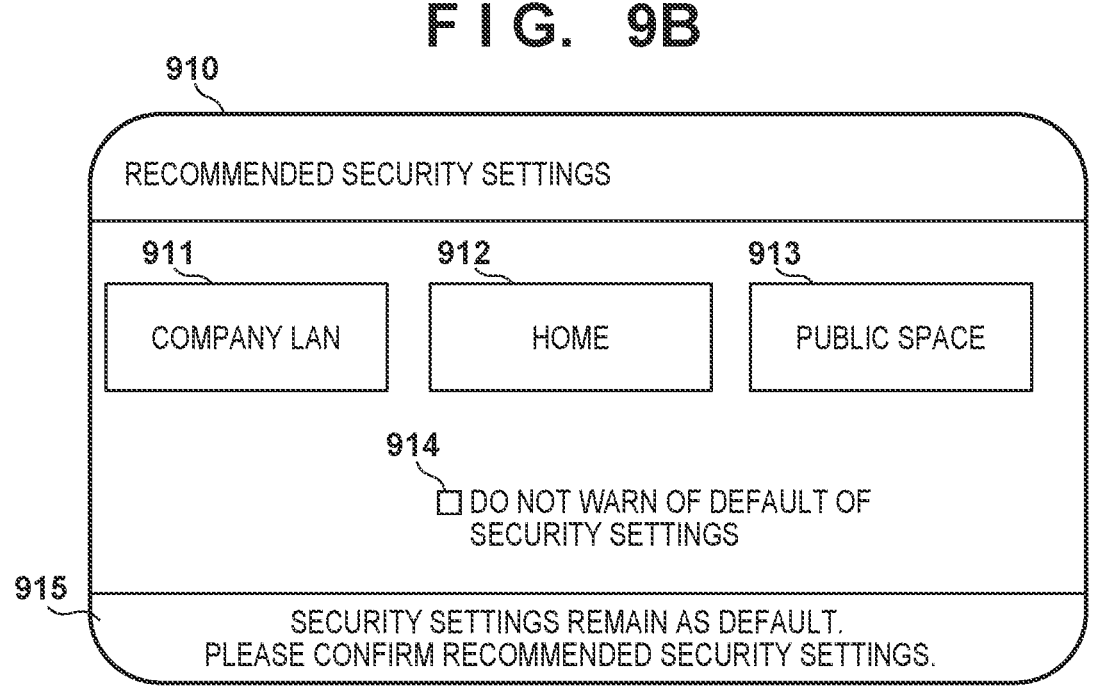

When the information notification portion 904 is touched by the user while the message is being displayed, the setting control unit 309 may switch the display screen of the operation unit 102 to a setting screen such as that illustrated in FIG. 9B. As described above, the setting control unit 309 may switch the display screen of the operation unit 102 to a setting screen (setting screen 910) for performing security-related settings in accordance with the usage environment of the MFP 100 in accordance with the user operation on the menu screen 900.

The notification of the message in the information notification portion 904 of the menu screen 900 may be limited to when the user who has an administrator authority is logged in. Thus, it is possible to prevent inadvertent notification that the security-related settings remain as the default settings when the user who does not have an administrator authority is operating the operation unit 102.

FIG. 9B illustrates, as an example of an operation screen to be displayed on the operation unit 102 in the MFP 100, the setting screen 910 for security settings. The setting screen 910 includes buttons 911 to 913, a check box 914, and an information notification portion 915. The button 911 is used for collectively performing appropriate settings for security-related setting items for when the usage environment of the MFP 100 is a company LAN. The button 912 is used for collectively performing appropriate settings for security-related setting items for when the usage environment of the MFP 100 is a home environment. The button 913 is used for collectively performing appropriate settings for security-related setting items for when the usage environment of the MFP 100 is a public space. When any of the buttons 911 to 913 is touched (selected) by the user, the setting control unit 309 collectively performs settings that correspond to the selected button. The buttons 911 to 913 are examples of display objects for instructing to collectively perform, for each usage environment of the MFP 100, settings that are suitable for that usage environment.

The check box 914 is used for performing, when there is no need to perform detection of whether the security-related settings have been changed from the default settings and execute, as necessary, processing for displaying a warning, a setting (warning-unnecessary setting) that eliminates a need to execute the processing. By performing the warning-unnecessary setting, the user can avoid the annoyance of an unnecessary notification being displayed when such a warning display is unnecessary.

Similarly to the information notification portion 904, the information notification portion 915 is used for notifying the user of information. Similarly to the notification in the information notification portion 904, the notification of the message in the information notification portion 915 (warning display) may be performed only when the user, who has the administrator authority, is logged in.

<MFP: Processing for Diagnosing Security-Related Settings>

Figure 10:
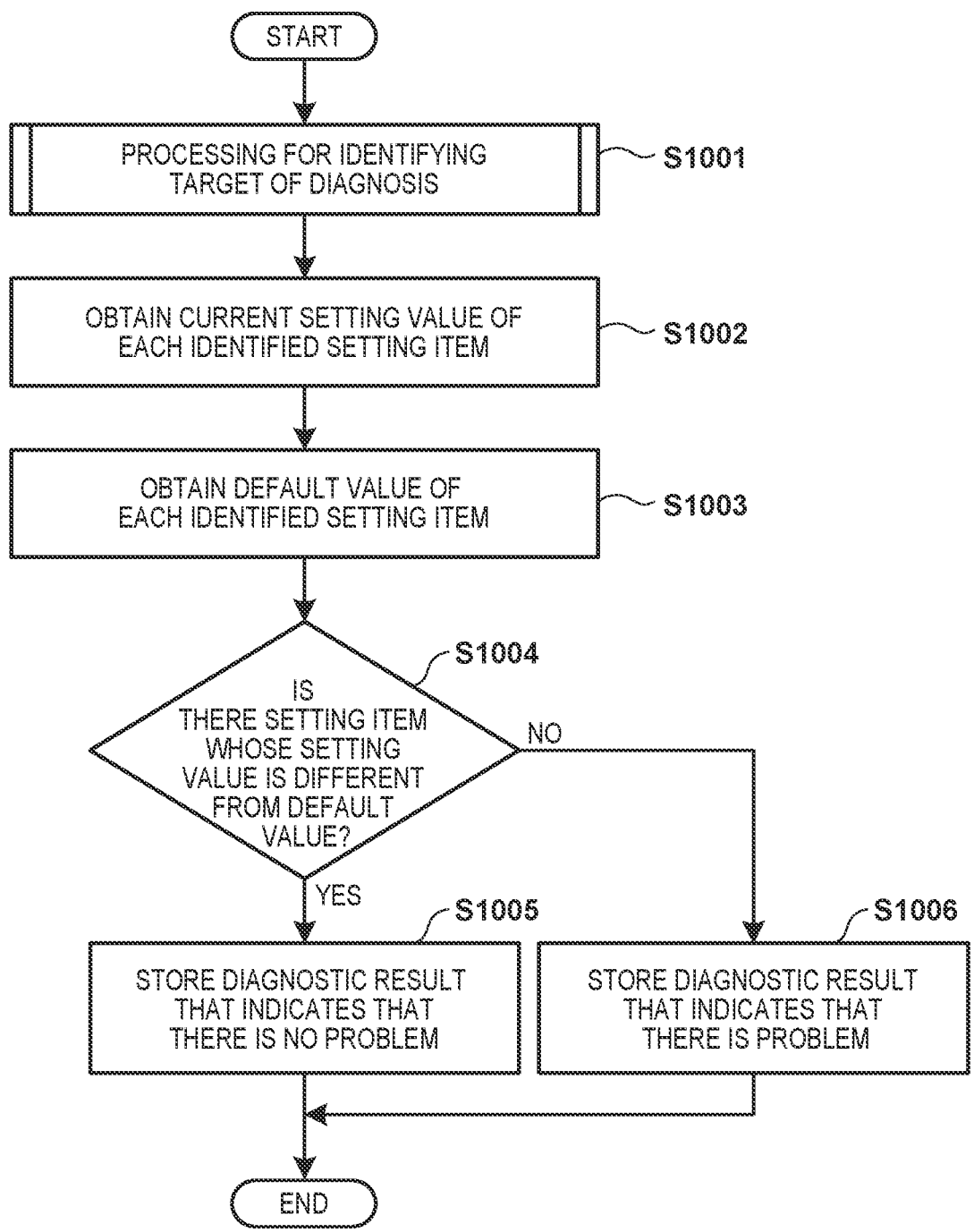
FIG. 10 is a flowchart for explaining an example of a sequence of processing for diagnosing security settings of the MFP, by the MFP.

FIG. 10 is a flowchart for explaining an example of a sequence of processing for diagnosing the security-related settings of the MFP 100 to be executed in the MFP 100. In this sequence of processing, the security-related settings of the MFP 100 are diagnosed by determining whether a setting change from the default setting has been made for the setting items that need to be changed in accordance with the usage environment of the MFP 100. Processing of each step of FIG. 10 is processing by the setting control unit 309 and is realized by processing in which the CPU 201 loads into the DRAM 202 a program that is stored in the flash ROM 211 and reads out and executes the loaded program.

When a change of a setting value that is held by the data storage unit 302 is detected, the MFP 100 (setting control unit 309) starts processing according to the sequence of FIG. 10. First, in step S1001, the MFP 100 performs identification processing for identifying a setting item to be diagnosed in a diagnosis of security-related settings in accordance with a sequence of FIG. 11, which will be described later.

Then, in step S1002, based on the setting information that is held by the data storage unit 302, the MFP 100 obtains the current setting value for each setting item that has been identified as a target of diagnosis in step S1001. Furthermore, in step S1003, the MFP 100 obtains a default value for each setting item that has been identified as a target of diagnosis in step S1001.

Next, in step S1004, similarly to step S705, the MFP 100 determines whether there is a setting item for which the current setting value and the default value differ by comparing the current setting value and the default value for each setting item that has been identified as a target of diagnosis in step S1001. If there is a setting item for which the current setting value and the default value differ, the MFP 100 advances the processing to step S1005. In step S1005, the MFP 100 generates as a diagnostic result of security-related settings a diagnostic result that indicates that there is no problem with the security-related settings. The MFP 100 stores the generated diagnostic result by the data storage unit 302 and terminates the processing according to the sequence of FIG. 10.

Meanwhile, as a result of the comparison in step S1004, if the current setting value and the default value match for all the setting items, the MFP 100 advances the processing from step S1004 to step S1006. In step S1006, the MFP 100 generates as a diagnostic result of security-related settings a diagnostic result that indicates that there is a problem with the security-related settings. The MFP 100 stores the generated diagnostic result by the data storage unit 302 and terminates the processing according to the sequence of FIG. 10.

The diagnostic result that has been stored by the data storage unit 302 may be used for notifying the user. For example, the MFP 100 may use the diagnostic result for notification in the information notification portion 904 or 915.

As described above, by the processing according to the sequence of FIG. 10, it is possible to generate a diagnostic result for notification in the information notification portion 904 or 915. That is, such a diagnostic result can be generated based on detection of whether the security-related settings that need to be changed in accordance with the usage environment of the MFP 100 have been changed from the default settings.

<MFP: Processing for Identifying Target of Diagnosis (Step S1001)>

Figure 11:
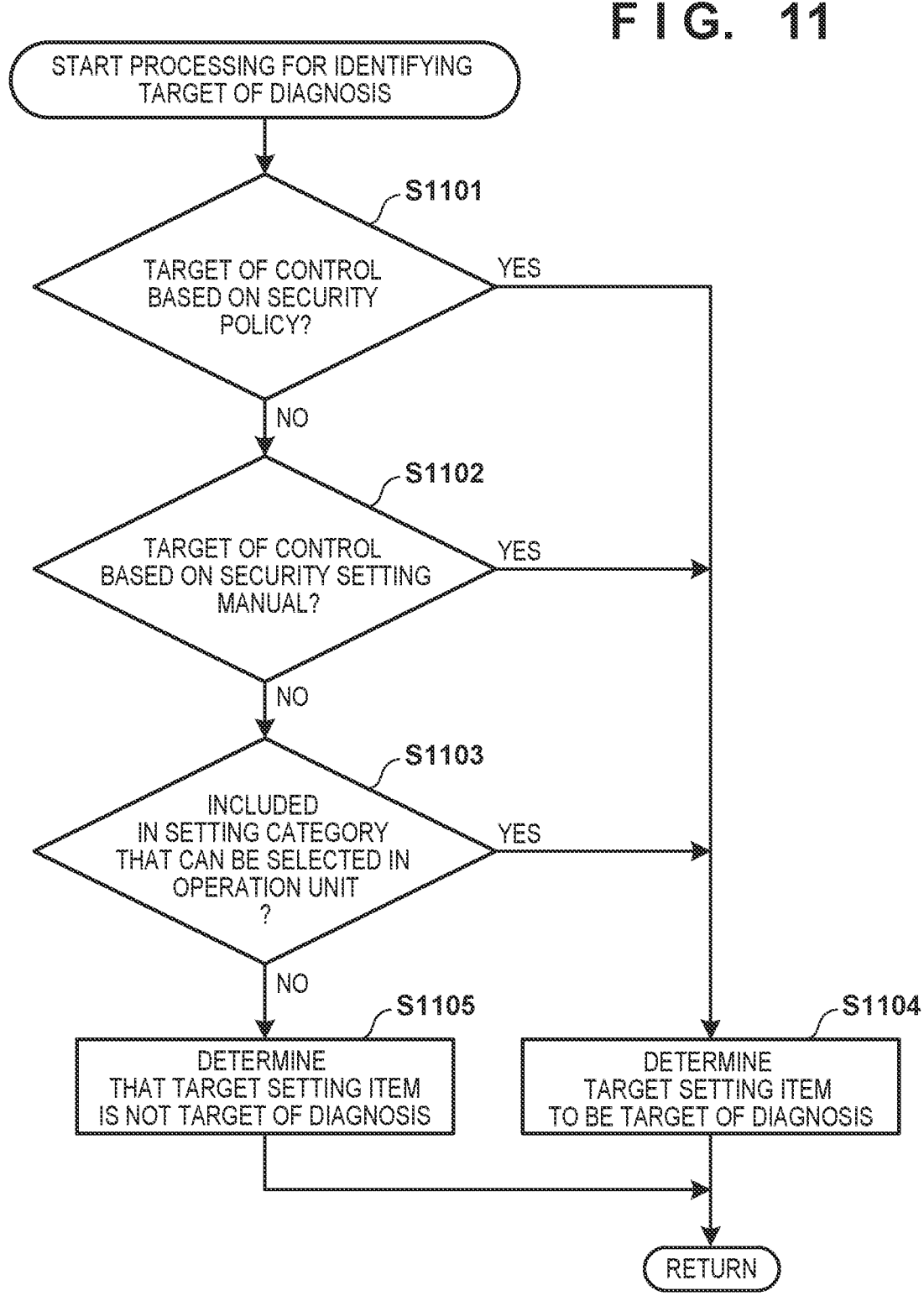
FIG. 11 is a flowchart for explaining an example of a sequence of processing for identifying a target of diagnosis (step S1002).

FIG. 11 is a flowchart for explaining an example of a sequence of processing for identifying a target of diagnosis (step S1001). The MFP 100 identifies setting items to be diagnosed in a diagnosis of security-related settings by executing on each setting item the processing according to the sequence of FIG. 11 for each setting item that is included in the setting information that is held by the data storage unit 302. In addition, the MFP 100 performs the determination processing of steps S1101 to S1103, which will be described below, based on the attribute information that is related to each security-related setting item that is held by the data storage unit 302.

In step S1101, similarly to step S801, the MFP 100 determines whether a target setting item is a setting item to be controlled based on a security policy (that is, a setting item whose setting is controlled collectively in accordance with a security policy). If the target setting item is a setting item to be controlled based on the security policy, the MFP 100 advances the processing to step S1104, and otherwise, the MFP 100 advances the processing to step S1102.

In step S1102, similarly to step S802, the MFP 100 determines whether the target setting item is a setting item to be controlled based on a security setting manual. If the target setting item is a setting item to be controlled based on a security setting manual, the MFP 100 advances the processing to step S1104, and otherwise, the MFP 100 advances the processing to step S1103.

In step S1103, similarly to step S803, the MFP 100 determines whether the target setting item is a setting item that is included in a setting category that can be selected in the operation unit 102 (a setting category that can be presented in the setting screen 500) of the MFP 100. If the target setting item is a setting item that is included in a setting category that can be selected by the operation unit 102 of the MFP 100, the MFP 100 advances the processing to step S1104, and otherwise, the MFP 100 advances the processing to step S1105.

In step S1104, the MFP 100 determines that the target setting item is a target of diagnosis and terminates the processing of step S1001. Meanwhile, in step S1105, the MFP 100 determines that the target setting item is not a target of diagnosis and terminates the processing of step S1001. As described above, by the determination of step S1104 or S1105 being performed for each setting item that is included in the setting information that is held by the data storage unit 302, it is possible to identify the setting items to be a target of diagnosis of security-related settings.

As described above, by the processing according to the sequence of FIG. 11, it is possible to identify as targets of diagnosis, security-related setting items that need to be changed in accordance with the usage environment of the MFP 100. A portion of the processing from step S1101 to S1103 may be omitted in accordance with operation forms and the like of the MFP 100 and the management system 121.

As described above, the MFP 100 of the present embodiment holds setting information that indicates settings of the MFP 100 and obtains a default setting for each of a plurality of particular setting items that are related to security among a plurality of setting items in the MFP 100. The MFP 100 detects, based on the received setting information, whether or not each setting of the plurality of particular setting items has been changed from the default setting. Furthermore, when it is detected that none of the settings of the plurality of particular setting items has been changed from the default setting, the MFP 100 notifies the user of that detection result.

This allows the user, who manages the MFP 100, to recognize that the security-related settings in the MFP 100 (information processing apparatus) have not been changed from the default settings. That is, it allows the user to properly recognize a need to review security-related settings in the MFP 100. Therefore, even if the user, who manages the MFP 100, does not have sufficient knowledge in security, it is possible to appropriately perform security-related settings in accordance with the usage environment of the MFP 100.

The MFP 100 may further notify a cloud system (the management system 121) of the above-described detection result via a network.

[Variation]

A configuration may be taken so as to further display on the management screen 400, which is illustrated in FIG. 4A, a link for transitioning to a setting screen that uses a WebUI that is provided by an MFP to be managed (e.g., the MFP 100). A description will be given in detail. To manage the MFP to be managed, the server 250 stores an IP address for accessing the MFP and a host name of the MFP in a storage, such as the HDD 255. The browser communication unit 351 generates, in addition to data for displaying the above-described screen 400, screen data that includes data for displaying a web link that is based on the IP address or the host name. At this time, the server 250 specifies, as a link destination of the web link, "http://the IP address of the MFP to be managed", "http://the host name of the MFP to be managed", or the like. Next, the generated screen is transmitted to a web browser of the PC 113. A configuration may be taken so as to include this link only when a diagnostic result is NG. A configuration may also be taken so as to open the web link in another tab from the currently-opened screen 400, which is illustrated in FIG. 4A. By selecting the web link, the user, who is viewing on the PC 113 the screen that includes the web link, can switch to a web page for viewing apparatus information and for changing apparatus settings that is provided by the MFP to be managed.

A configuration may also be taken so as to further display a notification message for recommending a countermeasure action to a user when a diagnostic result is NG. For example, a configuration may be taken so as to display a message that indicates that device settings related to security has not been implemented or a message that indicates that it is recommended to implement security settings. In such a case, the server 250 need only generate screen data that includes a label that corresponds to the message and provide it to a web browser.

In the above-described embodiments and the variation, a case where a warning or a recommendation for a countermeasure action is displayed when the security-related settings have not been changed from the default settings has been exemplified; however, the present invention is not limited to this. A configuration may be taken so as to further display, on screen 400, different types of warnings in addition to the warning that is related to default settings. A description will be given in detail. For example, assume that the server 250 manages an update state of firmware of the MFP to be managed. In this case, the server 250 also manages the latest version of the firmware that is provided to the market. The server 250 determines whether the latest firmware is adopted in the MFP to be managed by comparing the version of the firmware that is adopted in the MFP to be managed and the latest version of the firmware. Next, if the server 250 determines that the latest firmware has not been adopted in the MFP to be managed, the server 250 generates screen data that further includes data for displaying a second warning, which is related to firmware. The screen data may be configured such that a label, such as "firmware version diagnosis", is displayed as a label of the second warning and "NG" is displayed in a corresponding diagnostic result. The screen data may be configured so as to display "OK" if the server 250 determines that the latest firmware has been adopted in the MFP to be managed. A configuration may also be taken so as to display additional information in a case of displaying a warning that is related to firmware. For example, a configuration may be taken so as display information that indicates that there is firmware of a new version.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-206271, filed Dec. 20, 2021, which is hereby incorporated by reference herein in its entirety.

What is claimed is:

1. A server apparatus that is capable of communicating with an information processing apparatus, the server apparatus comprising:
   at least one memory that stores a program; and
   at least one processor that executes the program to perform:
   receiving setting information that indicates settings of the information processing apparatus;
   obtaining a default setting for each of a plurality of particular setting items that are related to security among a plurality of setting items in the information processing apparatus;
   detecting, based on the setting information, whether or not a setting of each of the plurality of particular setting items has been changed from the default setting; and
   providing, in a case where it has been detected that none of the settings of the plurality of particular setting items has been changed from the default setting, a detection result and a link to a setting manual, wherein the detection result and the link are displayed and setting values recommended to be set are displayed based on a user operation on the displayed link.

2. The server apparatus according to claim 1, wherein the plurality of particular setting items are defined as setting items for which a setting is to be changed from the default setting in accordance with a usage environment of the information processing apparatus.

3. The server apparatus according to claim 1, wherein the plurality of particular setting items include at least one of: a setting item whose setting is controlled based on a security policy that is set in the information processing apparatus; a setting item whose setting is controlled based on the setting manual for settings that are related to security in the information processing apparatus; and a setting item that is included in a security setting category that is selectable by a user operation in the information processing apparatus.

4. The server apparatus according to claim 1, wherein a setting item for which it becomes necessary to change a setting from the default setting for the detection is excluded from the plurality of particular setting items.

5. The server apparatus according to claim 4, wherein at least one of a setting item for connecting to a network, a setting item for connecting to a cloud system that includes the server apparatus, and a setting item for the detection by the server apparatus are excluded from the plurality of particular setting items.

6. The server apparatus according to claim 1, wherein the detection result and the link are provided to an external apparatus that is capable of communicating with the server apparatus and are displayed in the external apparatus.

7. The server apparatus according to claim 1, wherein the setting values recommended to be set are displayed in association with a usage environment of the information processing apparatus.

8. The server apparatus according to claim 6, wherein
a screen, to be displayed in the external apparatus, that indicates the detection result and the link includes a display object for performing a setting for stopping the notification of the detection result.

9. The server apparatus according to claim 6, wherein
the information processing apparatus with which the server apparatus communicates is a printing apparatus, and
the server apparatus is capable of providing, to the external apparatus so as to be displayed in the external apparatus, a screen that is different from a screen indicating the detection result and the link, and that indicates information that is related to a consumable of the printing apparatus.

10. An information processing system comprising:
a server apparatus according to claim 1; and
an information processing apparatus that is capable of communicating with the server apparatus,
wherein the information processing apparatus it transmits, to the server apparatus, setting information that indicates settings of the information processing apparatus at a predetermined transmission timing and, in accordance with a detection of a change in the settings of the information processing apparatus, transmits, to the server apparatus, setting information that indicates a setting of a setting item for which the change has been detected.

11. A control method of a server apparatus that is capable of communicating with an information processing apparatus, the control method comprising:
receiving setting information that indicates settings of the information processing apparatus;
obtaining a default setting for each of a plurality of particular setting items that are related to security among a plurality of setting items in the information processing apparatus;
detecting, based on the setting information, whether or not a setting of each of the plurality of particular setting items has been changed from the default setting; and
providing, in a case where it has been detected in the detecting that none of the settings of the plurality of particular setting items has been changed from the default setting, a detection result and a link to a setting manual, wherein the detection result and the link are displayed and setting values recommended to be set are displayed based on a user operation on the displayed link.

12. A non-transitory computer-readable storage medium storing a program for causing a computer to execute a control method of a server apparatus that is capable of communicating with an information processing apparatus, the control method comprising:
receiving setting information that indicates settings of the information processing apparatus;
obtaining a default setting for each of a plurality of particular setting items that are related to security among a plurality of setting items in the information processing apparatus;
detecting, based on the setting information, whether or not a setting of each of the plurality of particular setting items has been changed from the default setting; and
providing, in a case where it has been detected in the detecting that none of the settings of the plurality of particular setting items has been changed from the default setting, a detection result and a link to a setting manual, wherein the detection result and the link are displayed and setting values recommended to be set are displayed based on a user operation on the displayed link.

13. The server apparatus according to claim 7 wherein
the setting values recommended to be set are set to the information processing apparatus based on a user operation to select the usage environment of the information processing apparatus from among one or more usage environments.

14. The server apparatus according to claim 13 wherein the information processing apparatus is a printing apparatus.

15. The server apparatus according to claim 1 wherein
in a case where it has been detected that at least one of the settings of the plurality of particular setting items has been changed from the default setting, a detection result that indicates the at least one of the settings of the plurality of particular setting items has been changed from the default setting is provided and displayed.

* * * * *